(12) United States Patent
Takada et al.

(10) Patent No.: US 11,980,522 B2
(45) Date of Patent: May 14, 2024

(54) METHOD AND APPARATUS FOR DESIGNING DENTAL PROSTHETIC DEVICE

(71) Applicant: KABUSHIKI KAISHA SHOFU, Kyoto (JP)

(72) Inventors: Hajime Takada, Kyoto (JP); Tomoyuki Inoue, Kyoto (JP)

(73) Assignee: KABUSHIKI KAISHA SHOFU, Kyoto (JP)

( * ) Notice: Subject to any disclaimer, the term of this patent is extended or adjusted under 35 U.S.C. 154(b) by 422 days.

(21) Appl. No.: 17/164,205

(22) Filed: Feb. 1, 2021

(65) Prior Publication Data
US 2021/0236239 A1 Aug. 5, 2021

(30) Foreign Application Priority Data
Feb. 3, 2020 (JP) ................... 2020-016368

(51) Int. Cl.
*A61C 5/77* (2017.01)
*A61C 5/20* (2017.01)
(Continued)

(52) U.S. Cl.
CPC .......... *A61C 5/77* (2017.02); *A61C 5/20* (2017.02); *A61C 5/30* (2017.02); *A61C 13/0004* (2013.01)

(58) Field of Classification Search
CPC ......... A61C 13/0004; A61C 5/77; A61C 5/20; A61C 5/30; A61C 13/00; A61C 7/002; A61C 7/08
See application file for complete search history.

(56) References Cited

U.S. PATENT DOCUMENTS 4,997,373 A * 3/1991 Tanaka .................. A61C 13/09
433/204
6,049,743 A 4/2000 Baba
(Continued)

FOREIGN PATENT DOCUMENTS

DE 10 2014 110 154 1/2016
EP 1 459 702 9/2004
(Continued)

OTHER PUBLICATIONS

Extended European Search Report dated May 14, 2021 in European Patent Application No. 21154687.4.

*Primary Examiner* — Heidi M Eide
*Assistant Examiner* — Lina Faraj
(74) *Attorney, Agent, or Firm* — Wenderoth, Lind & Ponack, L.L.P.

(57) ABSTRACT

A dental prosthetic device design method according to an aspect of the present invention is a method for designing a dental prosthetic device by a computer, the method including: acquiring scan data of maxillary and mandibular dentitions; determining a restoration site of a tooth, based on the scan data; reading out plural pieces of attrition shape data of a tooth related to the restoration site, from maxillary and mandibular tooth shape data sets having plural pieces of attrition shape data with different degrees of attrition for each tooth of the maxillary and mandibular dentitions; selecting attrition shape data from among the plural pieces of attrition shape data, in accordance with the degrees of attrition of the maxillary and mandibular dentitions; placing the selected attrition shape data at the restoration site; and creating shape data of a dental prosthetic device from the attrition shape data placed at the restoration site.

12 Claims, 20 Drawing Sheets

(51) Int. Cl.
*A61C 5/30* (2017.01)
*A61C 13/00* (2006.01)

(56) References Cited

U.S. PATENT DOCUMENTS

| | | | |
|---|---|---|---|
| 7,160,110 B2 * | 1/2007 | Imgrund | G16H 20/30 |
| | | | 433/167 |
| 9,295,534 B2 * | 3/2016 | Ruppert | A61C 13/10 |
| 10,206,767 B2 * | 2/2019 | Boehm | A61C 19/045 |
| 2002/0150859 A1 * | 10/2002 | Imgrund | A61C 7/00 |
| | | | 433/24 |
| 2004/0185422 A1 | 9/2004 | Orth et al. | |
| 2004/0197727 A1 * | 10/2004 | Sachdeva | A61C 7/00 |
| | | | 433/24 |
| 2005/0095559 A1 * | 5/2005 | Monkmeyer | A61C 13/097 |
| | | | 433/171 |
| 2006/0063135 A1 * | 3/2006 | Mehl | G06F 18/28 |
| | | | 433/213 |
| 2006/0263739 A1 * | 11/2006 | Sporbert | A61C 9/0053 |
| | | | 433/213 |
| 2009/0148816 A1 * | 6/2009 | Marshall | A61C 5/77 |
| | | | 433/223 |
| 2012/0179281 A1 * | 7/2012 | Steingart | A61C 13/10 |
| | | | 703/11 |
| 2013/0054190 A1 * | 2/2013 | Kadobayashi | G16H 50/50 |
| | | | 702/155 |
| 2016/0004811 A1 * | 1/2016 | Somasundaram | G06T 19/20 |
| | | | 703/11 |
| 2016/0220173 A1 * | 8/2016 | Ribnick | A61B 5/7278 |
| 2017/0151046 A1 | 6/2017 | Boehm et al. | |
| 2018/0078347 A1 | 3/2018 | Falkel | |
| 2020/0268495 A1 * | 8/2020 | Ryakhovsky | A61C 19/05 |
| 2020/0383759 A1 * | 12/2020 | Je | G06T 19/20 |

FOREIGN PATENT DOCUMENTS

| | | |
|---|---|---|
| EP | 3 705 080 | 9/2020 |
| JP | 10-75963 | 3/1998 |
| JP | 2020-6082 | 1/2020 |

* cited by examiner

Fig.18

| | | DEGREE OF ATTRITION | | | | |
|---|---|---|---|---|---|---|
| | | S0 | S1 | S2 | S3 | S4 |
| TEETH OF THE MAXILLARY DENTITION | UPPER CENTRAL INCISOR T1 | 0mm | 0.20mm | 0.40mm | 0.75mm | 1.00mm |
| | UPPER LATERAL INCISOR T2 | 0mm | 0.10mm | 0.20mm | 0.40mm | 0.80mm |
| | UPPER CANINE T3 | 0mm | 0.40mm | 0.80mm | 1.00mm | 1.50mm |
| | UPPER FIRST PREMOLAR T4 | 0mm | 0.40mm | 0.80mm | 1.00mm | 1.40mm |
| | UPPER SECOND PREMOLAR T5 | 0mm | 0.30mm | 0.60mm | 0.75mm | 1.00mm |
| | UPPER FIRST MOLAR T6 | 0mm | 0.25mm | 0.50mm | 0.75mm | 1.00mm |
| | UPPER SECOND MOLAR T7 | 0mm | 0.25mm | 0.50mm | 0.75mm | 1.00mm |
| TEETH OF THE MANDIBULAR DENTITION | LOWER CENTRAL INCISOR T8 | 0mm | 0.20mm | 0.40mm | 0.75mm | 1.00mm |
| | LOWER LATERAL INCISOR T9 | 0mm | 0.10mm | 0.20mm | 0.40mm | 0.80mm |
| | LOWER CANINE T10 | 0mm | 0.40mm | 0.80mm | 1.00mm | 1.50mm |
| | LOWER FIRST PREMOLAR T11 | 0mm | 0.40mm | 0.80mm | 1.00mm | 1.40mm |
| | LOWER SECOND PREMOLAR T12 | 0mm | 0.30mm | 0.60mm | 0.75mm | 1.00mm |
| | LOWER FIRST MOLAR T13 | 0mm | 0.25mm | 0.50mm | 0.75mm | 1.00mm |
| | LOWER SECOND MOLAR T14 | 0mm | 0.25mm | 0.50mm | 0.75mm | 1.00mm |

METHOD AND APPARATUS FOR DESIGNING DENTAL PROSTHETIC DEVICE

BACKGROUND OF THE INVENTION

1. Field of the Invention

The present invention relates to a method and an apparatus for designing a dental prosthetic device.

2. Description of the Related Art

Japanese Laid-Open Patent Publication No. 10-75963 discloses a method for designing, on a computer, a dental prosthesis model such as a bridge and a crown by use of the computer. In the method described in Japanese Laid-Open Patent Publication No. 10-75963, a pontic model corresponding to each tooth shape is created, saved in a database, and used to design the dental prosthesis model such as the crown and the bridge.

The method described in Japanese Laid-Open Patent Publication No. 10-75963, however, still has room for improvement in terms of efficiently designing dental prostheses.

SUMMARY OF THE INVENTION

It is therefore an object of the present invention to provide a design method and a design apparatus capable of designing a dental prosthesis efficiently.

A dental prosthetic device design method of an aspect of the present invention is a method for designing a dental prosthetic device by use of a computer, including:
  acquiring scan data of maxillary and mandibular dentitions;
  determining a restoration site of a tooth, based on the scan data;
  reading out plural pieces of attrition shape data of a tooth related to the restoration site, from maxillary and mandibular tooth shape data sets having plural pieces of attrition shape data with different degrees of attrition for each tooth of the maxillary and mandibular dentitions;
  selecting attrition shape data from among the plural pieces of attrition shape data, in accordance with the degrees of attrition of the maxillary and mandibular dentitions;
  placing the selected attrition shape data at the restoration site; and
  creating shape data of a dental prosthetic device from the attrition shape data placed at the restoration site.

A dental prosthetic device design apparatus of an aspect of the present invention is an apparatus for designing a dental prosthetic device, including:
  a processor; and
  a storage device storing instructions executed by the processor,
  the storage device storing maxillary and mandibular tooth shape data sets having plural pieces of attrition shape data with different degrees of attrition for each tooth of maxillary and mandibular dentitions,
  the instructions including:
    acquiring scan data of the maxillary and mandibular dentitions;
    determining a restoration site of a tooth, based on the scan data;
    reading out plural pieces of attrition shape data of a tooth related to the restoration site, from the maxillary and mandibular tooth shape data sets;
    selecting attrition shape data from among the plural pieces of attrition shape data, in accordance with the degrees of attrition of the maxillary and mandibular dentitions;
    placing the selected attrition shape data at the restoration site; and
    creating shape data of a dental prosthetic device from the attrition shape data placed at the restoration site.

According to the present invention, the dental prosthesis can be designed efficiently.

BRIEF DESCRIPTION OF THE DRAWINGS

FIG. 18 is a table showing an example of the degrees of attrition of the first embodiment according to the present invention;

Figure 1:
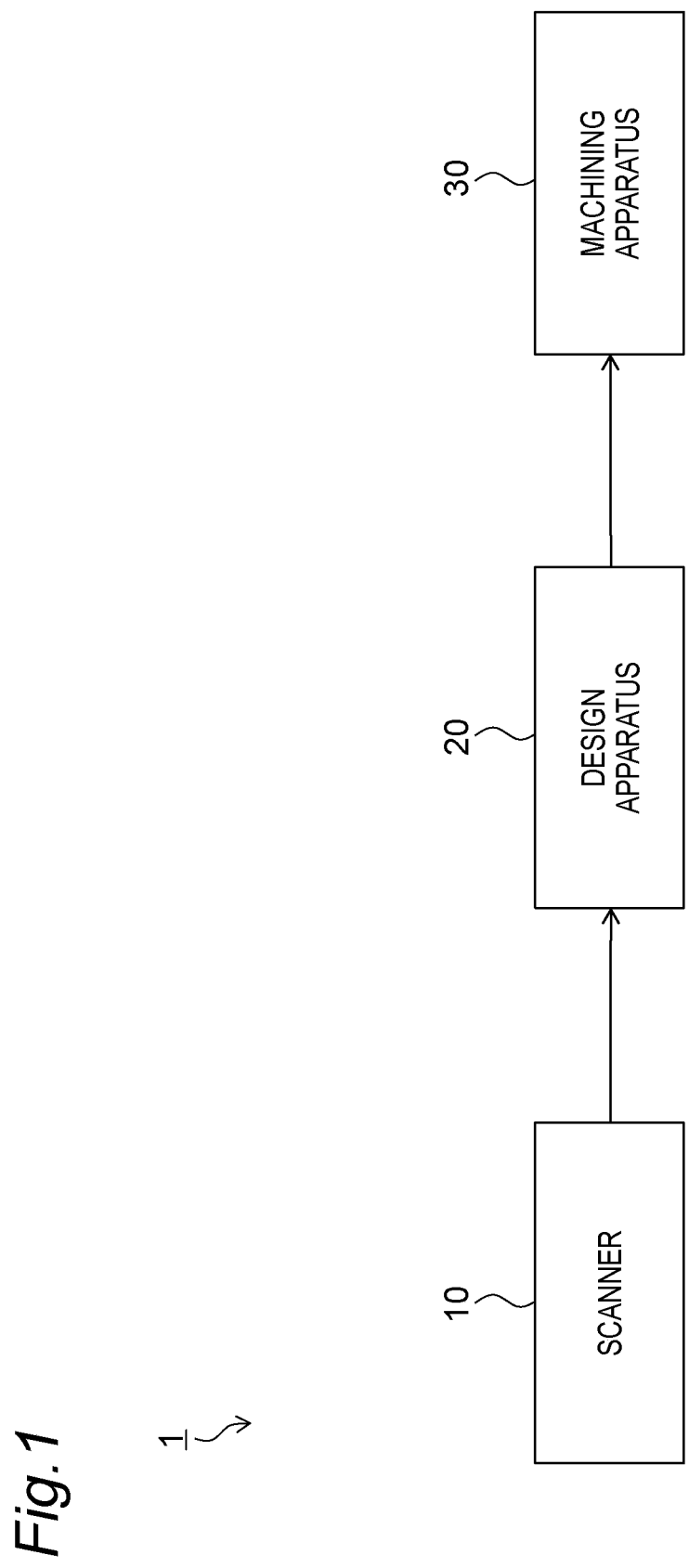
FIG. 1 is a block diagram showing an example of a dental prosthetic device producing system of a first embodiment according to the present invention.

DESCRIPTION OF THE PREFERRED EMBODIMENTS (Background to the Present Invention) In recent years, a method for producing a dental prosthetic device using CAD/CAM techniques is becoming widespread in the dental field. In such a method, patient's intraoral shape data is input to the computer so that a dental prosthetic device with a shape matching the patient's intraoral environment is created on the computer. The dental prosthetic device is then produced by machining based on the created shape data.

When designing the dental prosthetic device such as the crown and the bridge using CAD, the patient's intraoral shape data and tooth shape data saved in the database are imported on the computer. Then, at a site of a tooth to be restored on the patient's intraoral shape data, shape data of the corresponding tooth is placed, and the tooth shape is deformed by control point morphing, etc. As a result, a dental prosthetic device matching the patient's intraoral environment is designed in clinical practice.

On the other hand, after eruption, human teeth are worn down by the physiological function of occlusal mastication, continuing to change with age. Accordingly, the shape of the tooth continues to change due to attrition, etc.

The tooth shape data used for design of the dental prosthetic device using CAD, however, does not take the degree of attrition into consideration. That is, the tooth shape data has a general tooth shape that is not attrited. Therefore, in case of designing a dental prosthetic device for a patient with a large degree of attrition on the computer, there is a lot of work to change the shape of the tooth shape data in order to harmonize it with the patient's intraoral environment. This results in a problem that the dental prosthesis cannot be designed efficiently.

For example, there is a problem that as the amount of work increases, the design time cannot be shortened. In CAD used for designing dental prosthetic devices, in case of altering part of the shape in the tooth shape data, the shape of other portions may change in order to obtain the consistency of the tooth shape. Therefore, if the amount of work for altering the tooth shape data increases, it may be difficult to adjust the device to the patient's intraoral environment.

Thus, as a result of diligent study, the inventors found out designing a dental prosthetic device using tooth shape data with different degrees of attrition. Specifically, the inventors found out designing a dental prosthetic device using maxillary and mandibular tooth shape data sets having plural pieces of attrition shape data with different degrees of attrition for each tooth, and reached the invention below.

A dental prosthetic device design method of a first aspect of the present invention is a method for designing a dental prosthetic device by use of a computer, including acquiring scan data of maxillary and mandibular dentitions; determining a restoration site of a tooth, based on the scan data; reading out plural pieces of attrition shape data of a tooth related to the restoration site, from maxillary and mandibular tooth shape data sets having plural pieces of attrition shape data with different degrees of attrition for each tooth of the maxillary and mandibular dentitions; selecting attrition shape data from among the plural pieces of attrition shape data, in accordance with the degrees of attrition of the maxillary and mandibular dentitions; placing the selected attrition shape data at the restoration site; and creating shape data of a dental prosthetic device from the attrition shape data placed at the restoration site.

In the dental prosthetic device design method of a second aspect of the present invention, the plural pieces of attrition shape data may include plural pieces of shape data of a tooth whose attrition portion is drilled stepwise from the crown side toward the root side, for each of a plurality of teeth.

In the dental prosthetic device design method of a third aspect of the present invention, the maxillary and mandibular tooth shape data sets may include: shape data of maxillary teeth including an upper central incisor, an upper lateral incisor, an upper canine, an upper first premolar, an upper second premolar, an upper first molar, and an upper second molar; and shape data of mandibular teeth including a lower central incisor, a lower lateral incisor, a lower canine, a lower first premolar, a lower second premolar, a lower first molar, and a lower second molar.

The human average amount of attrition is, for example, 30 (μm/year) in molar enamel, with about 2.0 (mm) attrition in 60 years. In dentistry in an aging society, it is also necessary to reconstruct teeth destroyed by attrition, etc. with restoration materials. In the dental prosthetic device design method of a fourth aspect of the present invention, to harmonize the designed prosthetic device with the dentition worn down by aging, the following preferable numerical range was set. The shape data of the maxillary teeth may include: plural pieces of attrition shape data of the upper central incisor whose lingual surface in contact with an opposing tooth is drilled stepwise within a range of 0.00 mm or more and 1.50 mm or less from a crown side toward the root side; plural pieces of attrition shape data of the upper lateral incisor whose lingual surface in contact with an opposing tooth is drilled stepwise within the range of 0.00 mm or more and 1.50 mm or less from the crown side toward the root side; plural pieces of attrition shape data of the upper canine whose lingual surface in contact with an opposing tooth is drilled stepwise within the range of 0.00 mm or more and 2.00 mm or less from the crown side toward the root side; plural pieces of attrition shape data of the upper first premolar whose occlusal surface in contact with an opposing tooth is drilled stepwise within the range of 0.00 mm or more and 2.00 mm or less from the crown side toward the root side; plural pieces of attrition shape data of the upper second premolar whose occlusal surface in contact with an opposing tooth is drilled stepwise within the range of 0.00 mm or more and 2.00 mm or less from the crown side toward the root side; plural pieces of attrition shape data of the upper first molar whose occlusal surface in contact with an opposing tooth is drilled stepwise within the range of 0.00 mm or more and 1.50 mm or less from the crown side toward the root side; and plural pieces of attrition shape data of the upper second molar whose occlusal surface in contact with an opposing tooth is drilled stepwise within the range of 0.00 mm or more and 1.50 mm or less from the crown side toward the root side, while the shape data of the mandibular teeth may include: plural pieces of attrition shape data of the lower central incisor whose incisal edge in contact with an opposing tooth is drilled stepwise within the range of 0.00 mm or more and 1.50 mm or less from the crown side toward the root side; plural pieces of attrition shape data of the lower lateral incisor whose incisal edge in contact with an opposing tooth is drilled stepwise within the range of 0.00 mm or more and 1.50 mm or less from the crown side toward the root side; plural pieces of attrition shape data of the lower canine whose apex in contact with an opposing tooth is drilled stepwise within a range of 0.00 mm or more and 2.00 mm or less from the crown side toward the root side; plural pieces of attrition shape data of the lower first premolar whose occlusal surface in contact with an opposing tooth is drilled stepwise within the range of 0.00 mm or more and 2.00 mm or less from the crown side toward the root side; plural pieces of attrition shape data of the lower second premolar whose occlusal surface in contact with an opposing tooth is drilled stepwise within the range of 0.00 mm or more and 2.00 mm or less from the crown side toward the root side; plural pieces of attrition shape data of the lower first molar whose occlusal surface in contact with an opposing tooth is drilled stepwise within the range of 0.00 mm or more and 1.50 mm or less from the crown side toward the root side; and plural pieces of attrition shape data of the lower second molar whose occlusal surface in contact with an opposing tooth is drilled stepwise within the range of 0.00 mm or more and 1.50 mm or less from the crown side toward the root side. In the present invention, for design convenience, the maximum amount of attrition is divided into, for example, four stages, and the numerical range is set so as to be adaptable to various patients.

In the dental prosthetic device design method of a fifth aspect of the present invention, the reading out may include displaying the plural pieces of attrition shape data on a display device, and the selecting may include selecting the attrition shape data from among the plural pieces of attrition shape data, based on input information input to an input device through a user's operation.

In the dental prosthetic device design method of a sixth aspect of the present invention, the selecting may include: creating a virtual curve joining buccal cusp apexes of the molars and premolars, an apex of a canine, and incisal edges of incisors when maxillary and mandibular dentitions are viewed from the lateral side; and selecting the attrition shape data from among the plural pieces of attrition shape data, based on the virtual curve.

In the dental prosthetic device design method of a seventh aspect of the present invention, the selecting the attrition shape data from among the plural pieces of attrition shape data based on the virtual curve may include: placing the plural pieces of attrition shape data at the restoration site such that tooth tips lie on the virtual curve; calculating, on the plural pieces of attrition shape data, a distance between a marginal ridge of a tooth represented by attrition shape data, whose tip lies on the virtual curve, and the marginal ridge of a tooth adjacent to the tooth represented by attrition shape data; and selecting the attrition shape data from among the plural pieces of attrition shape data, based on the distance calculated.

In the dental prosthetic device design method of an eighth aspect of the present invention, the selecting the attrition shape data from among the plural pieces of attrition shape data based on the virtual curve may include: placing the plural pieces of attrition shape data at the restoration site such that tooth tips lie on the virtual curve; calculating, on the plural pieces of attrition shape data, an amount of interference or an amount of separation between a tooth represented by attrition shape data and an opposing tooth at the time when a maxillary dentition and a mandibular dentition occlude; and selecting the attrition shape data from among the plural pieces of attrition shape data, based on the amount of interference or the amount of separation calculated.

In the dental prosthetic device design method of a ninth aspect of the present invention, the selecting the attrition shape data from among the plural pieces of attrition shape data based on the amount of interference or the amount of separation calculated may include selecting attrition shape data with the amount of interference or the amount of separation equal to or less than 0.5 mm.

A dental prosthetic device design apparatus of a tenth aspect of the present invention is an apparatus for designing a dental prosthetic device, including: a processor; and a storage device storing instructions executed by the processor, the storage device storing maxillary and mandibular tooth shape data sets having plural pieces of attrition shape data with different degrees of attrition for each tooth of maxillary and mandibular dentitions, the instructions including: acquiring scan data of the maxillary and mandibular dentitions; determining a restoration site of a tooth, based on the scan data; reading out plural pieces of attrition shape data of a tooth related to the restoration site, from the maxillary and mandibular tooth shape data sets; selecting attrition shape data from among the plural pieces of attrition shape data, in accordance with the degrees of attrition of the maxillary and mandibular dentitions; placing the selected attrition shape data, at the restoration site; and creating shape data of a dental prosthetic device from the attrition shape data placed at the restoration site.

A computer-readable recording medium of an eleventh aspect of the present invention stores therein a program for causing a computer to execute the method of any one of the first to the ninth aspects.

A program of a twelfth aspect of the present invention causes a computer to execute the method of any one of the first to the ninth aspects.

Embodiments of the present invention will now be described with reference to the accompanying drawings. The following descriptions are given essentially as mere exemplifications and are not intended to limit this disclosure, its applications, or its uses. Furthermore, the drawings are schematic and the dimensional ratios, etc. do not necessarily conform to the actual ones.

First Embodiment

[Dental Prosthetic Device Producing System]

FIG. 1 is a block diagram showing an example of a dental prosthetic device producing system 1 of a first embodiment according to the present invention. As shown in FIG. 1, the dental prosthetic device producing system 1 includes a scanner 10, a design apparatus 20, and a machining apparatus 30.

<Scanner>

The scanner 10 scans maxillary and mandibular dentition shapes. For example, the scanner 10 scans the patient's oral cavity directly to thereby acquire shape data i.e. scan data of the patient's maxillary and mandibular dentitions. Alternatively, the scanner 10 scans a model that reproduces the shape of the patient's oral cavity to thereby acquire the shape data i.e. scan data of the patient's maxillary and mandibular dentitions. The model is created by taking an impression of the patient's oral cavity with an impression material and pouring plaster into the impression.

The scanner 10 is a dental 3D scanner for example. The dental 3D scanner can be e.g. an optical scanner. The scan data is three-dimensional shape data of the maxillary and mandibular dentitions.

The shape data i.e. the scan data of the maxillary and mandibular dentitions scanned by the scanner 10 is sent to the design apparatus 20.

<Design Apparatus>

The design apparatus 20 acquires the scan data of the maxillary and mandibular dentitions from the scanner 10 and designs a dental prosthetic device based on the scan data. The design apparatus 20 designs shape data of a dental prosthetic device using the scan data and maxillary and mandibular tooth shape data sets having plural pieces of attrition shape data with different degrees of attrition for each tooth of the maxillary and mandibular dentitions. The design apparatus 20 is a computer for example.

Design data of the dental prosthetic device designed by the design apparatus 20 is sent to the machining apparatus 30. For example, the design data is an STL data including the shape data of the dental prosthetic device.

<Machining Apparatus>

The machining apparatus 30 machines the dental prosthetic device based on the design data designed by the design apparatus 20. For example, the machining apparatus 30 may be a 3D printer or a cutting device.

In this manner, in the dental prosthetic device producing system 1, the scanner 10 scans the shapes of the maxillary and mandibular dentitions. The design apparatus 20 designs the shape data (design data) of the dental prosthetic device using the scan data acquired from the scanner 10 and the maxillary and mandibular tooth shape data sets having plural pieces of attrition shape data with different degrees of attrition for each tooth. The machining apparatus machines the dental prosthetic device based on the design data acquired from the design apparatus 20. The dental prosthetic device is hereby produced.

[Design Apparatus]

Figure 2:
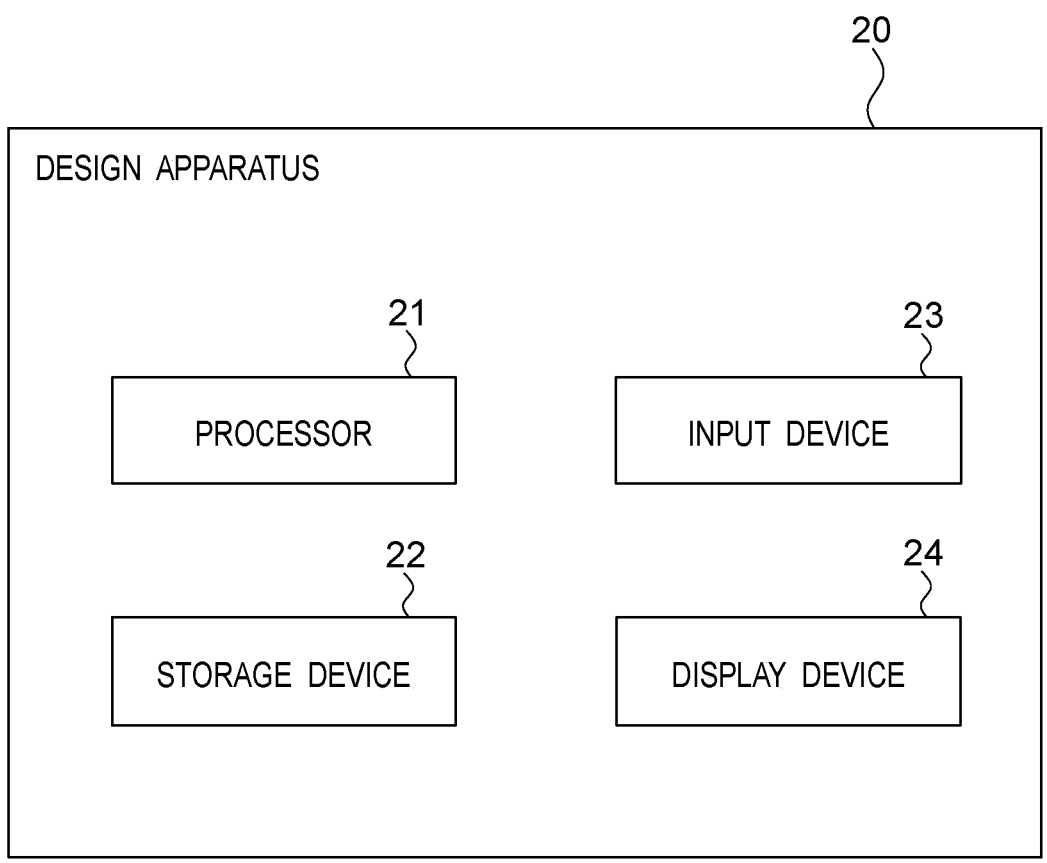
FIG. 2 is a block diagram showing an example of a design apparatus of the first embodiment according to the present invention.

The design apparatus 20 will be described in detail. FIG. 2 is a block diagram showing an example of the design apparatus 20 of the first embodiment according to the present invention. As shown in FIG. 2, the design apparatus 20 includes a processor 21, a storage device 22, an input device 23, and a display device 24. The design apparatus 20 is a computer for example.

<Processor>

The processor 21 is for example a central processing unit (CPU), a microprocessor, or other processing units capable of executing computer-executable instructions. The processor 21 can execute instructions stored in the storage device 22.

<Storage Device>

The storage device 22 is for example a computer recording medium that stores instructions executed by the processor. The storage device 22 may be for example a RAM, a ROM, an EEPROM, a flash memory, or other memory technologies, a CD-ROM, a DVD, or other optical disc storages, a magnetic cassette, a magnetic tape, a magnetic disc storage, or other magnetic storage devices.

The storage device 22 stores the maxillary and mandibular tooth shape data sets having plural pieces of attrition shape data with different degrees of attrition for each tooth. The storage device 22 stores a dental CAD program.

<Input Device>

The input part 23 is a device that accepts a user's input. The input part 23 may include e.g. a keyboard, a mouse, and a voice input device. By operating the input device 23, the user can design the dental prosthetic device.

<Display Device>

The display device 24 is a device that displays information. The display device 24 is a display for example. On the display device 24, for example, a design screen for designing a dental prosthetic device is displayed. The design screen includes scan data of the maxillary and mandibular dentitions and the attrition shape data.

Elements making up the design apparatus 20 can be realized by a computing device realizable by semiconductor elements, etc. Functions of these constituent elements may be configured by hardware only or may be implemented by combining hardware and software.

Note that the elements making up the design apparatus 20 are not limited thereto. The design apparatus 20 may include elements other than these elements. For example, the design apparatus 20 may include a communication device that communicates with another device. The communication device includes a circuit that communicates with an external device in conformity with a predetermined communication standard (e.g. LAN, Wi-Fi (registered trademark), Bluetooth (registered trademark), USB, HDMI (registered trademark), controller area network (CAN), or serial peripheral interface (SPI)).

<Maxillary and Mandibular Dentition Sets with Different Degrees of Attrition>

Figure 3:
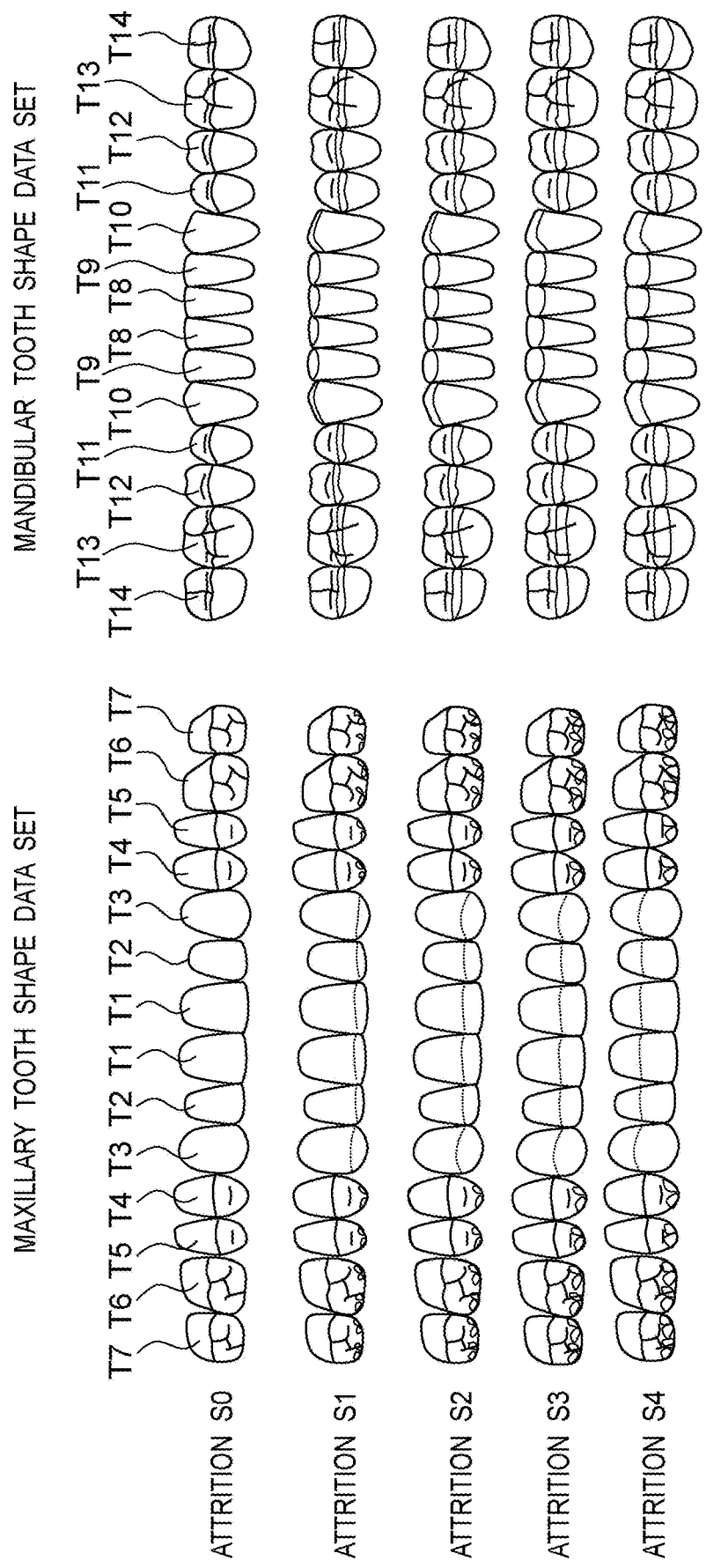
FIG. 3 is a schematic view showing an example of shape data of maxillary and mandibular dentition sets with different degrees of attrition.

FIG. 3 is a schematic view showing an example of shape data of maxillary and mandibular dentition sets with different degrees of attrition. As shown in FIG. 3, the shape data of the maxillary and mandibular dentition sets includes a maxillary tooth shape data set and a mandibular tooth shape data set.

The maxillary tooth shape data set includes shape data of an upper central incisor T1, an upper lateral incisor T2, an upper canine T3, an upper first premolar T4, an upper second premolar T5, an upper first molar T6, and an upper second molar T7. Specifically, the maxillary tooth shape data set includes shape data of the upper central incisor T1, the upper lateral incisor T2, the upper canine T3, the upper first premolar T4, the upper second premolar T5, the upper first molar T6, and the upper second molar T7 that lie on the left side of the maxillary dentition, and the upper central incisor T1, the upper lateral incisor T2, the upper canine T3, the upper first premolar T4, the upper second premolar T5, the upper first molar T6, and the upper second molar T7 that lie on the right side thereof.

The mandibular tooth shape data set includes tooth shape data of a lower central incisor T8, a lower lateral incisor T9, a lower canine T10, a lower first premolar T11, a lower second premolar T12, a lower first molar T13, and a lower second molar T14. Specifically, the mandibular tooth shape data set includes shape data of the lower central incisor T8, the lower lateral incisor T9, the lower canine T10, the lower first premolar T11, the lower second premolar T12, the lower first molar T13, and the lower second molar T14 that lie on the left side of the mandibular dentition, and the lower central incisor T8, the lower lateral incisor T9, the lower canine T10, the lower first premolar T11, the lower second premolar T12, the lower first molar T13, and the lower second molar T14 that lie on the right side thereof.

The shape data of the maxillary and mandibular dentition sets has plural pieces of attrition shape data with different degrees of attrition for each tooth of the maxillary and mandibular dentitions. In other words, the plural pieces of attrition shape data have shape data with the degree of attrition changed, for each of a plurality of teeth.

The plural pieces of attrition shape data include plural pieces of shape data of a tooth whose attrition portion is drilled stepwise from the crown side toward the root side, for each of a plurality of teeth. The attrition portion is a portion that comes into contact when the maxillary and mandibular dentitions occlude. For example, the attrition portion is an occlusal surface. In other words, the plural pieces of attrition shape data include plural pieces of shape data of a tooth whose attrition portion is changed stepwise in shape, for each of a plurality of teeth.

"Drilled stepwise" means that the amount of drilling increases stepwise. "Increases stepwise" may include: increasing regularly; increasing at equal intervals; increasing exponentially; or increasing at random.

In the first embodiment, the plural pieces of attrition shape data include tooth shape data in which the attrition portion only is drilled stepwise, for each of a plurality of teeth. In other words, the plural pieces of attrition shape data include tooth shape data in which portions other than the attrition portion are not drilled, for each of a plurality of teeth.

In the example shown in FIG. 3, the shape data of the maxillary and mandibular dentition sets has the degrees of attrition increased stepwise in the order of attrition S0, attrition S1, attrition S2, attrition S3, and attrition S4. That is, in the shape data of the maxillary and mandibular dentitions sets, the degree of attrition is attrition S0<attrition S1<attrition S2<attrition S3<attrition S4. Attrition S0 is "0" in degree of attrition.

It is to be noted that the degree of attrition may differ for each tooth of the maxillary and mandibular dentitions. For example, at attrition S1, the degree of attrition of the upper central incisor T1 and the degree of attrition of the upper second molar T7 may differ. The degree of attrition of the upper second molar T7 may be greater than the degree of attrition of the upper central incisor T1. For example, the degree of attrition of the upper central incisor T1 may be 0.125 mm, whereas the degree of attrition of the upper second molar T7 may be 0.25 mm.

FIGS. 4 to 10 are schematic views showing an example of attrition shape data of the upper central incisor T1, the upper lateral incisor T2, the upper canine T3, the upper first premolar T4, the upper second premolar T5, the upper first molar T6, and the upper second molar T7.

As shown in FIGS. 4 to 10, the maxillary tooth shape data set has plural pieces of attrition shape data in which the attrition portion is drilled stepwise from the crown side toward the root side for each of a plurality of teeth of the maxillary dentition. In the first embodiment, the maxillary tooth shape data set has five pieces of attrition shape data at attritions S0 to S4 with different degrees of attrition.

Figure 4:
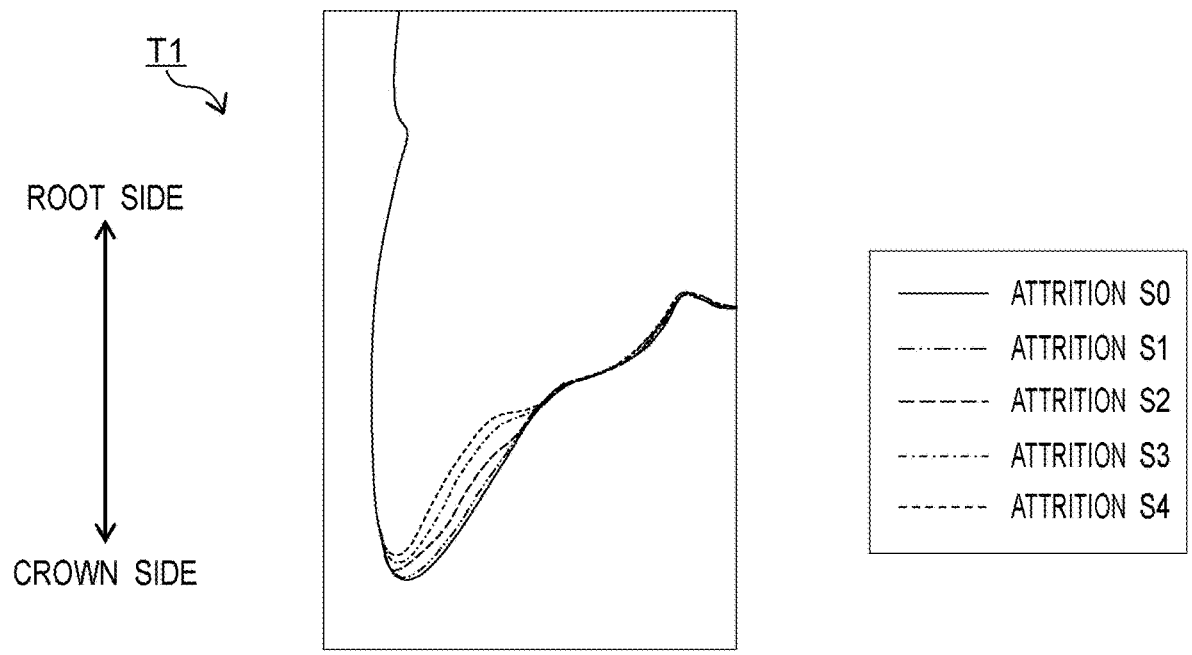
FIG. 4 is a schematic view showing an example of attrition shape data of an upper central incisor with different degrees of attrition.

As shown in FIG. 4, the upper central incisor T1 has plural pieces of attrition shape data in which its lingual surface in contact with the opposing tooth is drilled stepwise within the range of 0.00 mm or more and 1.50 mm or less from the crown side toward the root side. Preferably, in the plural pieces of attrition shape data of the upper central incisor T1, its lingual surface in contact with the opposing tooth is drilled stepwise within the range of 0.00 mm or more and 1.00 mm or less from the crown side toward the root side. In the upper central incisor T1, the attrition portion includes an incisal edge.

Figure 5:
FIG. 5 is a schematic view showing an example of attrition shape data of an upper lateral incisor with different degrees of attrition.

As shown in FIG. 5, the upper lateral incisor T2 has plural pieces of attrition shape data in which its lingual surface in contact with the opposing tooth is drilled stepwise within the range of 0.00 mm or more and 1.50 mm or less from the crown side toward the root side. Preferably, in the plural pieces of attrition shape data of the upper lateral incisor T2, its lingual surface in contact with the opposing tooth is drilled stepwise within the range of 0.00 mm or more and 0.80 mm or less from the crown side toward the root side. In the upper lateral incisor T2, the attrition portion includes an incisal edge.

Figure 6:
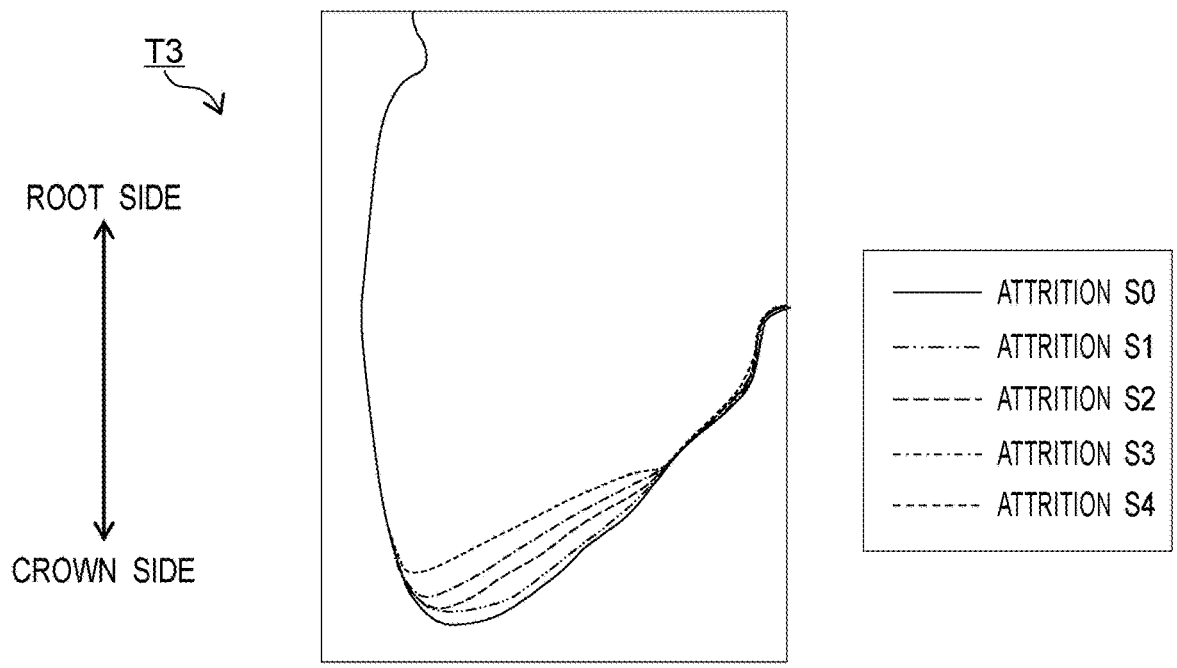
FIG. 6 is a schematic view showing an example of attrition shape data of an upper canine with different degrees of attrition.

As shown in FIG. 6, the upper canine T3 has plural pieces of attrition shape data in which its lingual surface in contact with the opposing tooth is drilled stepwise within the range of 0.00 mm or more and 2.00 mm or less from the crown side toward the root side. Preferably, in the plural pieces of attrition shape data of the upper canine T3, its lingual surface in contact with the opposing tooth is drilled stepwise within the range of 0.00 mm or more and 1.50 mm or less from the crown side toward the root side. In the upper canine T3, the attrition portion includes an apex.

Figure 7:
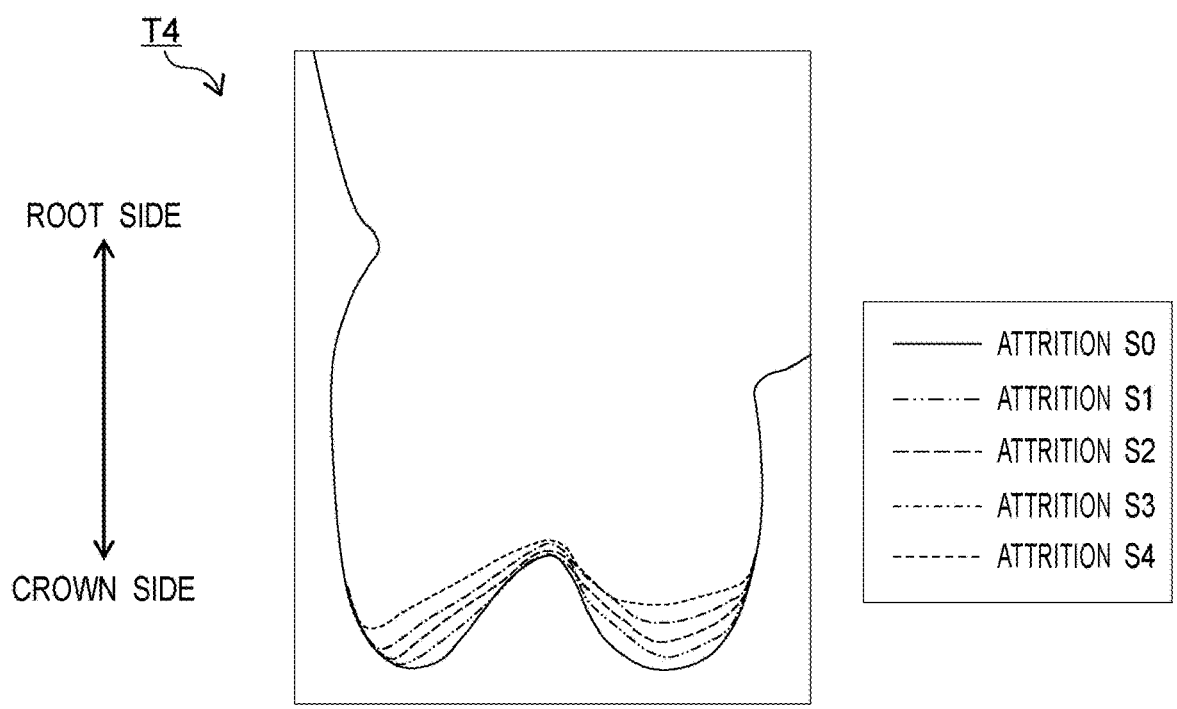
FIG. 7 is a schematic view showing an example of attrition shape data of an upper first premolar with different degrees of attrition.

As shown in FIG. 7, the upper first premolar T4 has plural pieces of attrition shape data in which its occlusal surface in contact with the opposing tooth is drilled stepwise within the range of 0.00 mm or more and 2.00 mm or less from the crown side toward the root side. Preferably, in the plural pieces of attrition shape data of the upper first premolar T4, its occlusal surface in contact with the opposing tooth is drilled stepwise within the range of 0.00 mm or more and 1.40 mm or less from the crown side toward the root side. In the upper first premolar T4, the attrition portion includes a cusp apex.

Figure 8:
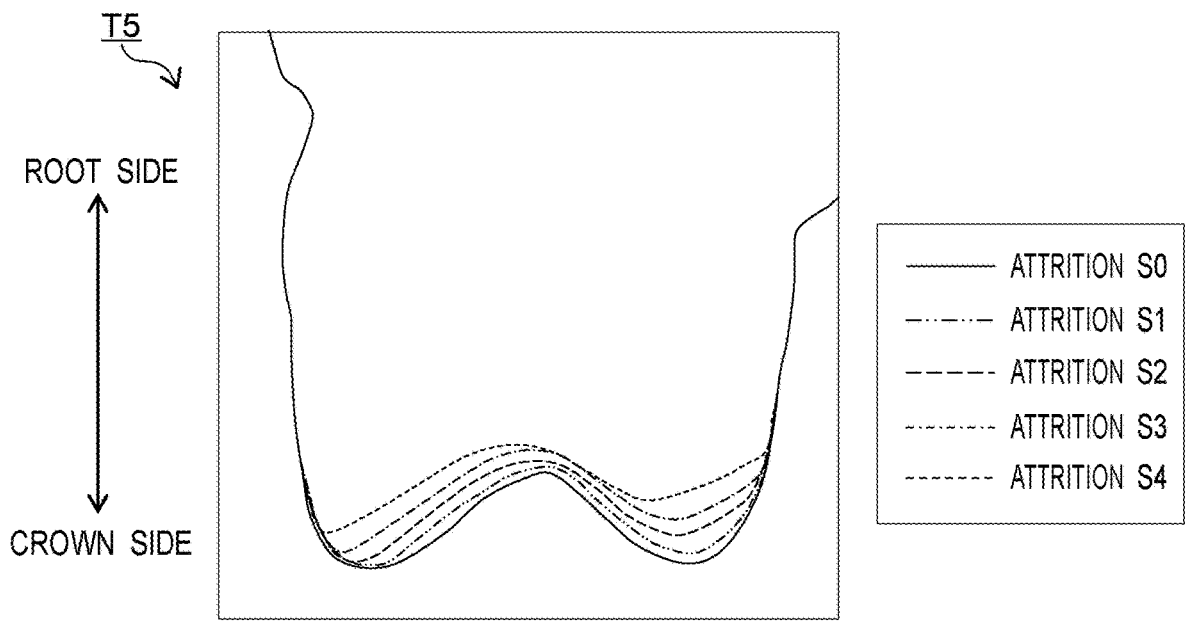
FIG. 8 is a schematic view showing an example of attrition shape data of an upper second premolar with different degrees of attrition.

As shown in FIG. 8, the upper second premolar T5 has plural pieces of attrition shape data in which its occlusal surface in contact with the opposing tooth is drilled stepwise within the range of 0.00 mm or more and 2.00 mm or less from the crown side toward the root side. Preferably, in the plural pieces of attrition shape data of the upper second premolar T5, its occlusal surface in contact with the opposing tooth is drilled stepwise within the range of 0.00 mm or more and 1.00 mm or less from the crown side toward the root side. In the upper second premolar T5, the attrition portion includes a cusp apex.

Figure 9:
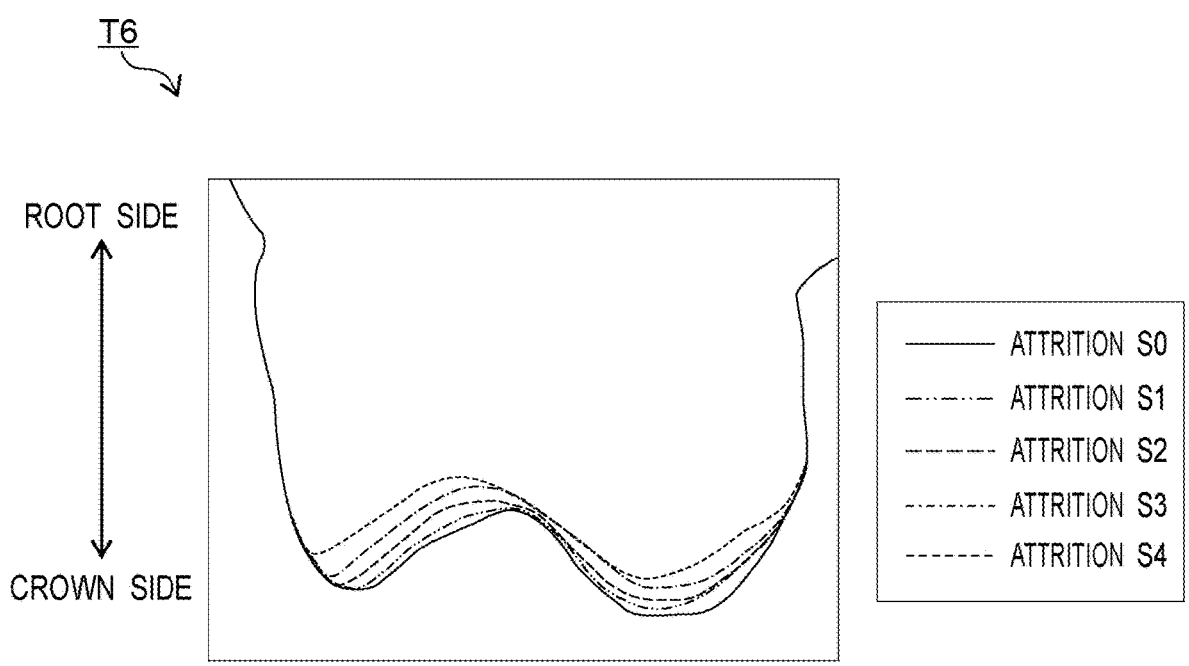
FIG. 9 is a schematic view showing an example of attrition shape data of an upper first molar with different degrees of attrition.

As shown in FIG. 9, the upper first molar T6 has plural pieces of attrition shape data in which its occlusal surface in contact with the opposing tooth is drilled stepwise within the range of 0.00 mm or more and 1.50 mm or less from the crown side toward the root side. Preferably, in the plural pieces of attrition shape data of the upper first molar T6, its occlusal surface in contact with the opposing tooth is drilled stepwise within the range of 0.00 mm or more and 1.00 mm or less from the crown side toward the root side. In the upper first molar T6, the attrition portion includes a cusp apex.

Figure 10:
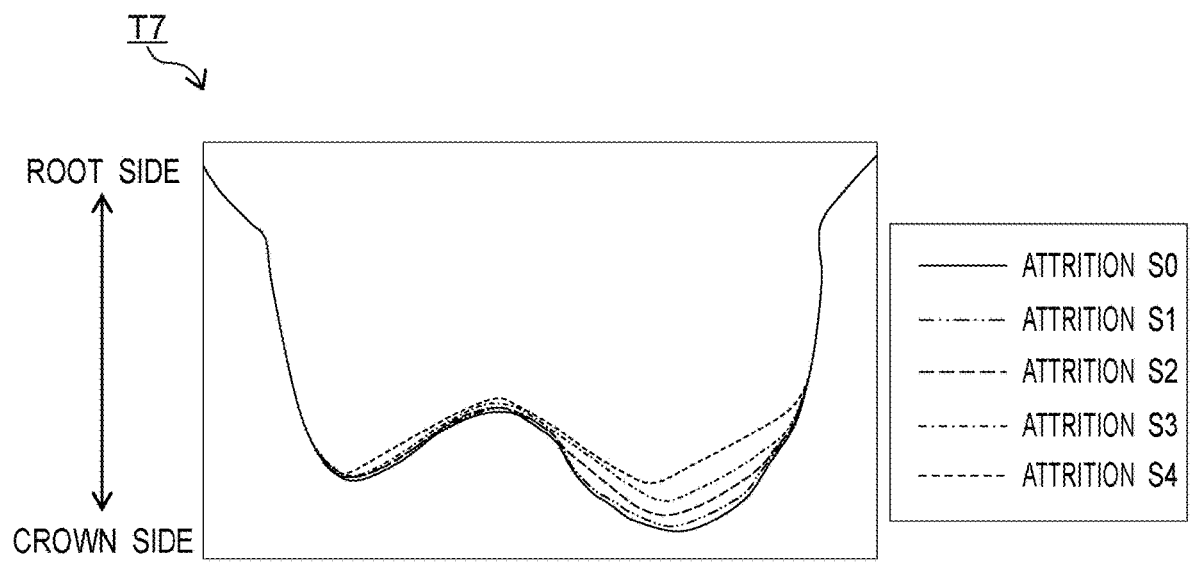
FIG. 10 is a schematic view showing an example of attrition shape data of an upper second molar with different degrees of attrition.

As shown in FIG. 10, the upper second molar T7 has plural pieces of attrition shape data in which its occlusal surface in contact with the opposing tooth is drilled stepwise within the range of 0.00 mm or more and 1.50 mm or less from the crown side toward the root side. Preferably, in the plural pieces of attrition shape data of the upper second molar T7, its occlusal surface in contact with the opposing tooth is drilled stepwise within the range of 0.00 mm or more and 1.00 mm or less from the crown side toward the root side. In the upper second molar T7, the attrition portion includes a cusp apex.

FIGS. 11 to 17 are schematic views showing an example of the lower central incisor T8, the lower lateral incisor T9, the lower canine T10, the lower first premolar T11, the lower second premolar T12, the lower first molar T13, and the lower second molar T14.

As shown in FIGS. 11 to 17, the mandibular tooth shape data set has plural pieces of attrition shape data in which the attrition portion is drilled stepwise from the crown side toward the root side for each of a plurality of teeth of the mandibular dentition. In the first embodiment, the mandibular tooth shape data set has five pieces of attrition shape data at attritions S0 to S4 with different degrees of attrition.

Figure 11:
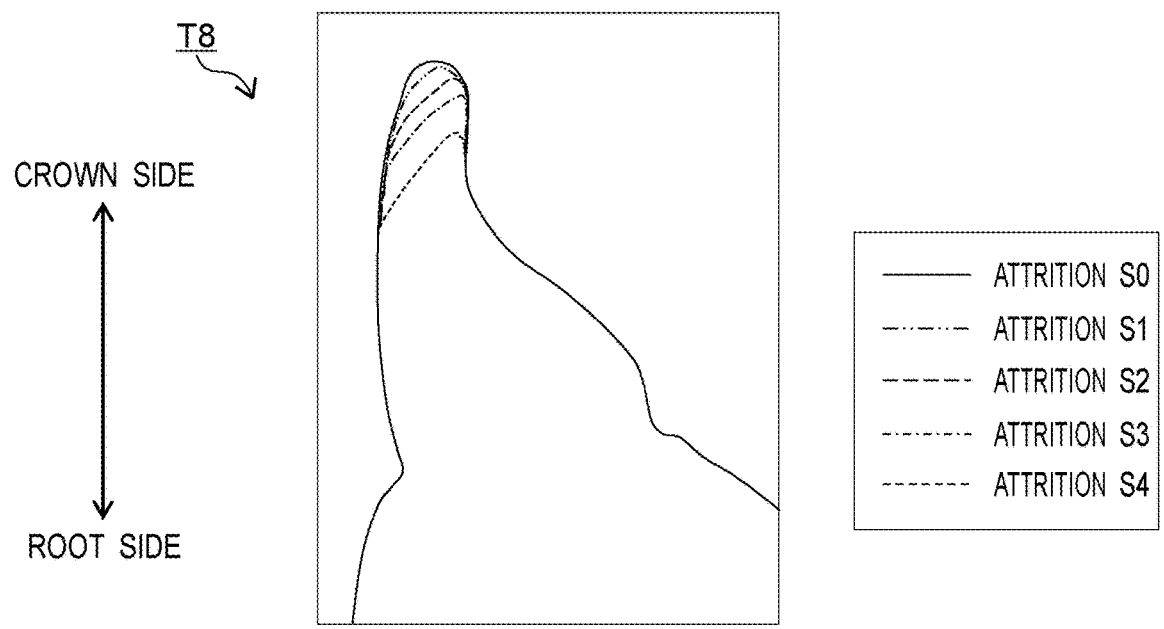
FIG. 11 is a schematic view showing an example of attrition shape data of a lower central incisor with different degrees of attrition.

As shown in FIG. 11, the lower central incisor T8 has plural pieces of attrition shape data in which its incisal edge in contact with the opposing tooth is drilled stepwise within the range of 0.00 mm or more and 1.50 mm or less from the crown side toward the root side. Preferably, in the plural pieces of attrition shape data of the lower central incisor T8, its incisal edge in contact with the opposing tooth is drilled stepwise within the range of 0.00 mm or more and 1.00 mm or less from the crown side toward the root side.

Figure 12:
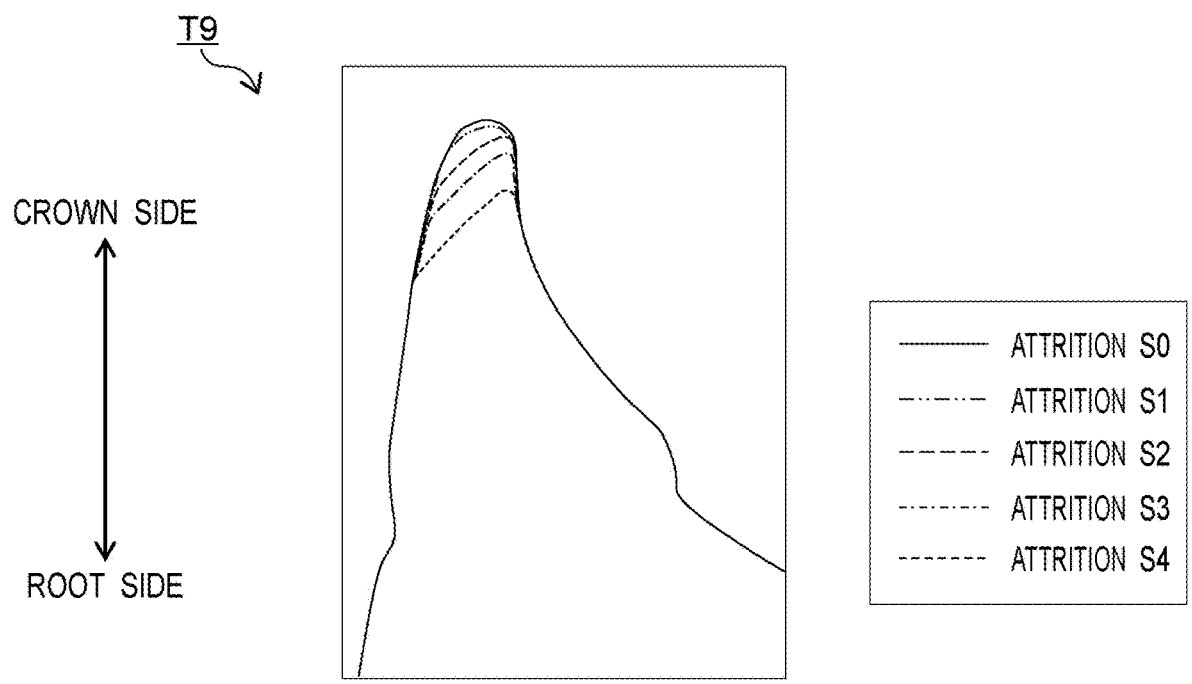
FIG. 12 is a schematic view showing an example of attrition shape data of a lower lateral incisor with different degrees of attrition.

As shown in FIG. 12, the lower lateral incisor T9 has plural pieces of attrition shape data in which its incisal edge in contact with the opposing tooth is drilled stepwise within the range of 0.00 mm or more and 1.50 mm or less from the crown side toward the root side. Preferably, in the plural pieces of attrition shape data of the lower lateral incisor T9, its incisal edge in contact with the opposing tooth is drilled stepwise within the range of 0.00 mm or more and 0.80 mm or less from the crown side toward the root side.

Figure 13:
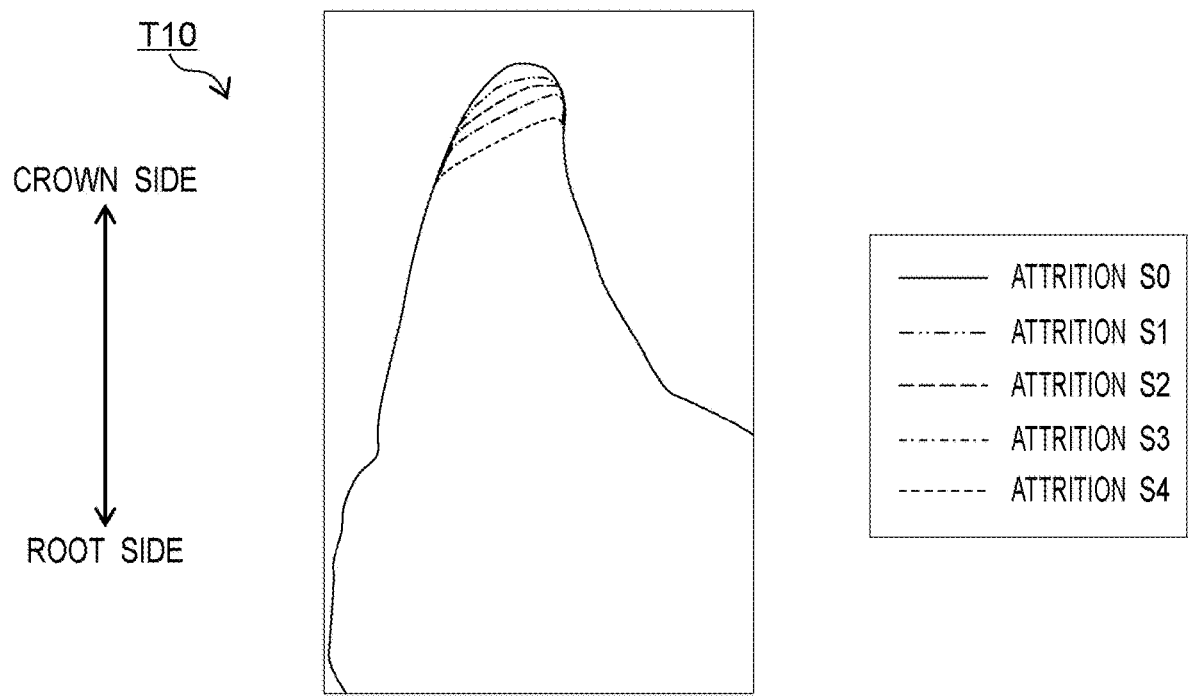
FIG. 13 is a schematic view showing an example of attrition shape data of a lower canine with different degrees of attrition.

As shown in FIG. 13, the lower canine T10 has plural pieces of attrition shape data in which its apex in contact with the opposing tooth is drilled stepwise within the range of 0.00 mm or more and 2.00 mm or less from the crown side toward the root side. Preferably, in the plural pieces of attrition shape data of the lower canine T10, its apex in contact with the opposing tooth is drilled stepwise within the range of 0.00 mm or more and 1.50 mm or less from the crown side toward the root side.

Figure 14:
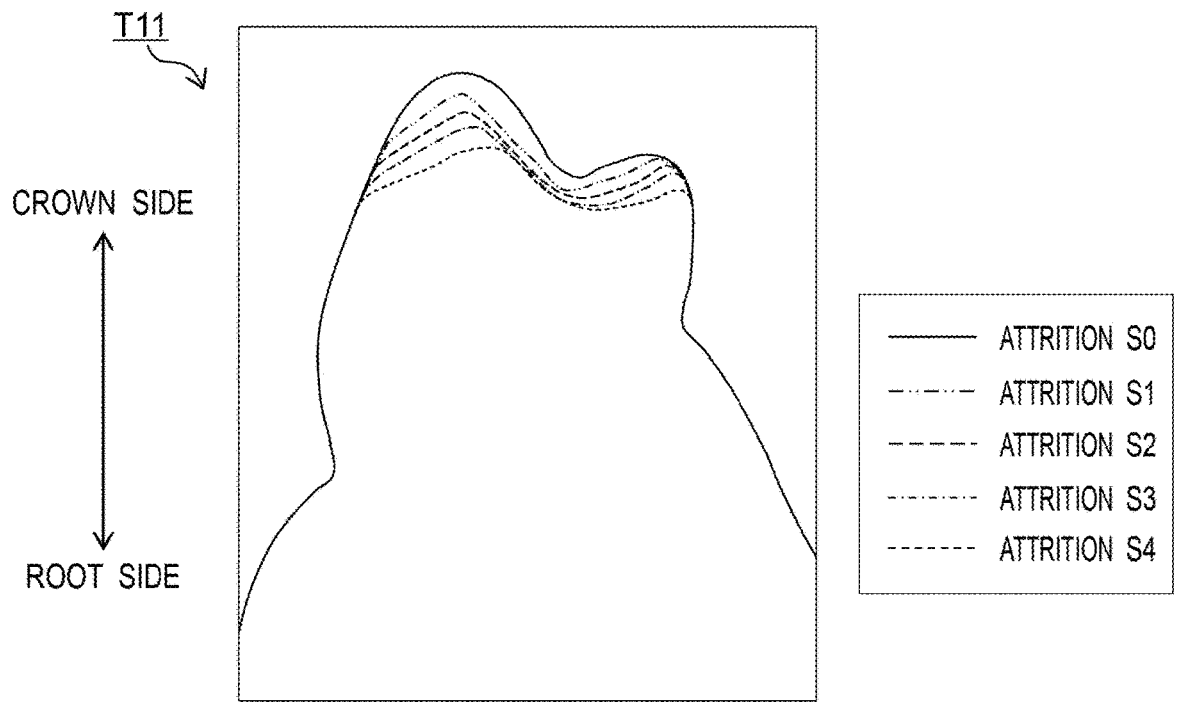
FIG. 14 is a schematic view showing an example of attrition shape data of a lower first premolar with different degrees of attrition.

As shown in FIG. 14, the lower first premolar T11 has plural pieces of attrition shape data in which its occlusal surface in contact with the opposing tooth is drilled stepwise within the range of 0.00 mm or more and 2.00 mm or less from the crown side toward the root side. Preferably, in the plural pieces of attrition shape data of the lower first premolar T11, its occlusal surface in contact with the opposing tooth is drilled stepwise within the range of 0.00 mm or more and 1.40 mm or less from the crown side toward the root side. In the lower first premolar T11, the attrition portion includes a cusp apex.

Figure 15:
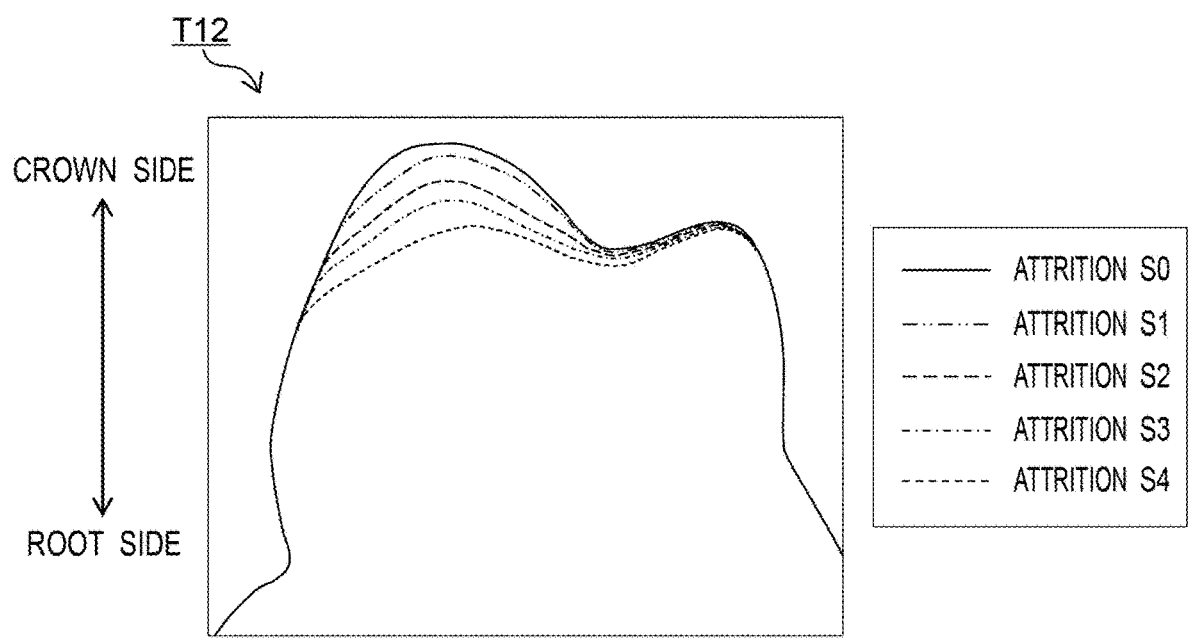
FIG. 15 is a schematic view showing an example of attrition shape data of a lower second premolar with different degrees of attrition.

As shown in FIG. 15, the lower second premolar T12 has plural pieces of attrition shape data in which its occlusal surface in contact with the opposing tooth is drilled stepwise within the range of 0.00 mm or more and 2.00 mm or less from the crown side toward the root side. Preferably, in the plural pieces of attrition shape data of the lower second premolar T12, its occlusal surface in contact with the opposing tooth is drilled stepwise within the range of 0.00 mm or more and 1.00 mm or less from the crown side toward the root side. In the lower second premolar T12, the attrition portion includes a cusp apex.

Figure 16:
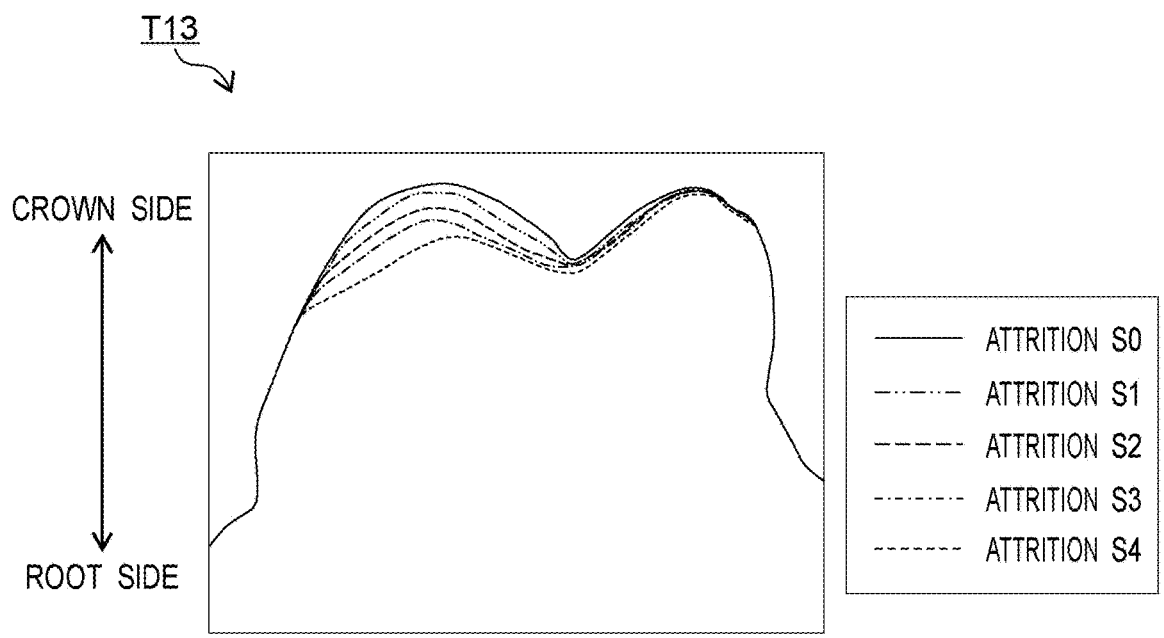
FIG. 16 is a schematic view showing an example of attrition shape data of a lower first molar with different degrees of attrition.

As shown in FIG. 16, the lower first molar T13 has plural pieces of attrition shape data in which its occlusal surface in contact with the opposing tooth is drilled stepwise within the range of 0.00 mm or more and 1.50 mm or less from the crown side toward the root side. Preferably, in the plural pieces of attrition shape data of the lower first molar T13, its occlusal surface in contact with the opposing tooth is drilled stepwise within the range of 0.00 mm or more and 1.00 mm or less from the crown side toward the root side. In the lower first molar T13, the attrition portion includes a cusp apex.

Figure 17:
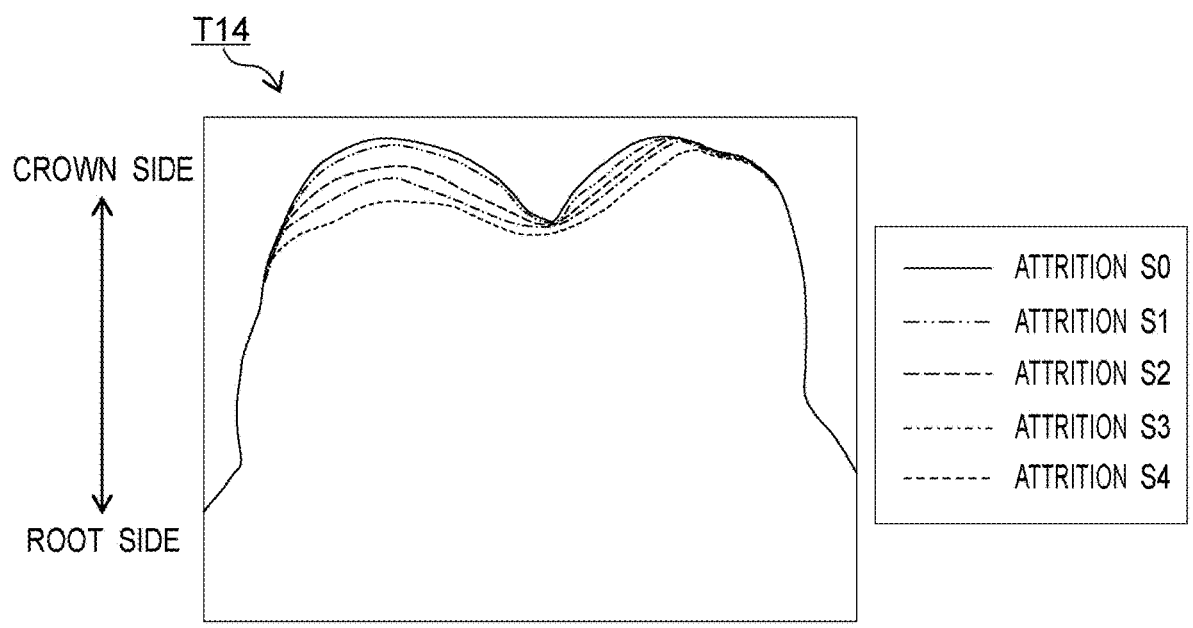
FIG. 17 is a schematic view showing an example of attrition shape data of a lower second molar with different degrees of attrition.

As shown in FIG. 17, the lower second molar T14 has plural pieces of attrition shape data in which its occlusal surface in contact with the opposing tooth is drilled stepwise within the range of 0.00 mm or more and 1.50 mm or less from the crown side toward the root side. Preferably, in the plural pieces of attrition shape data of the lower second molar T14, its occlusal surface in contact with the opposing tooth is drilled stepwise within the range of 0.00 mm or more and 1.00 mm or less from the crown side toward the root side. In the lower second molar T14, the attrition portion includes a cusp apex.

FIG. 18 is a table showing an example of the degrees of attrition of the first embodiment according to the present invention. As shown in FIG. 18, the shape data of the maxillary and mandibular dentition sets has the degrees of attrition increased stepwise in the order of attrition S0, attrition S1, attrition S2, attrition S3, and attrition S4. It should be noted that the degrees of attrition shown in FIG. 18 are exemplifications and that the degrees of attrition can be set to any values.

Although in the first embodiment the example has been described where the shape data of the maxillary and mandibular dentition sets has five pieces of attrition shape data at attritions S0 to S4 with different degrees of attrition, this is not limitative. The shape data of the maxillary and mandibular dentition sets needs only to have plural pieces of attrition shape data with different degrees of attrition. For example, the shape data of the maxillary and mandibular dentition sets needs only to have two or more pieces of attrition shape data with different degrees of attrition.

[About Creating Maxillary and Mandibular Dentition Sets with Different Degrees of Attrition]

The maxillary and mandibular dentition sets with different degrees of attrition are created based on e.g. dentition models with different degrees of attrition. Specifically, dentition models with different degrees of attrition are made to acquire three-dimensional shape data of the dentition models with different degrees of attrition. This enables plural pieces of attrition shape data with different degrees of attrition to be created for each of a plurality of teeth of the maxillary and mandibular dentitions.

[About an Example of Making Plaster Dentition Model]

28 kinds of tooth sculptures are made using Inlay Wax (Inlay Wax Medium, GC Co., Ltd., Japan) and an Evans chisel. These sculptures are subjected to duplicating impression with a duplicating impression silicone (DUPLICONE, Shofu Inc., Japan), to replace the tooth sculptures with plaster in the form of super hard plaster (NEW FUJIROCK, GC Co., Ltd., Japan). The plaster tooth sculptures are arranged in accordance with an anatomical tooth axis on a mean value articulator. Front teeth are set to have an overbite of 1.0 mm and an overjet of 1.0 mm. The ABC contact is imparted to the molars under one-to-two occlusion so that canine-guided occlusion is reproduced. Gums are then formed using paraffin wax, to make a dentition model. The dentition model is subjected to duplicating impression using the duplicating impression silicone, to make a plaster dentition model.

<About an Example of Making Dentition Model with Different Degrees of Attrition>

The thus made plaster maxillary and mandibular dentition models are mounted on a semiadjustable articulator (Pro Arch IV, Shofu Inc., Japan). The sagittal condylar path angle is set to 33 degrees, the lateral condylar path angle to 10.7 degrees, and the immediate side shift to 1.0 mm. The occlusal contact areas at the maximal intercuspal position and in the left and right lateral movements and anterior movement are then marked with occlusal registration paper so that the marked portions are ground in with an Evans chisel. By repeating these works, a dentition model with a pseudo attrition state is made. The grinding-in amount of the model is set to be 0 mm, 0.5 mm, 1.0 mm, 1.5 mm, and 2.0 mm in total amount of attrition of the upper and lower second molars. When the total amount of attrition is reached, three-dimensional measurement is performed using a laboratory desktop scanner (D2000, 3 Shape Inc., Denmark), to acquire three-dimensional shape data of a dentition model with different pseudo degrees of attrition.

<About an Example of Creating Attrition Shape Data>

The dentition model shape data obtained by the three-dimensional measurement is trimmed with three-dimensional CAD software (RHINOCEROUS, ROBERT McNeel & Associates, Inc., France) and then undergoes a cavity filling process to thereby create attrition shape data of each individual tooth.

[Design Method]

Figure 19:
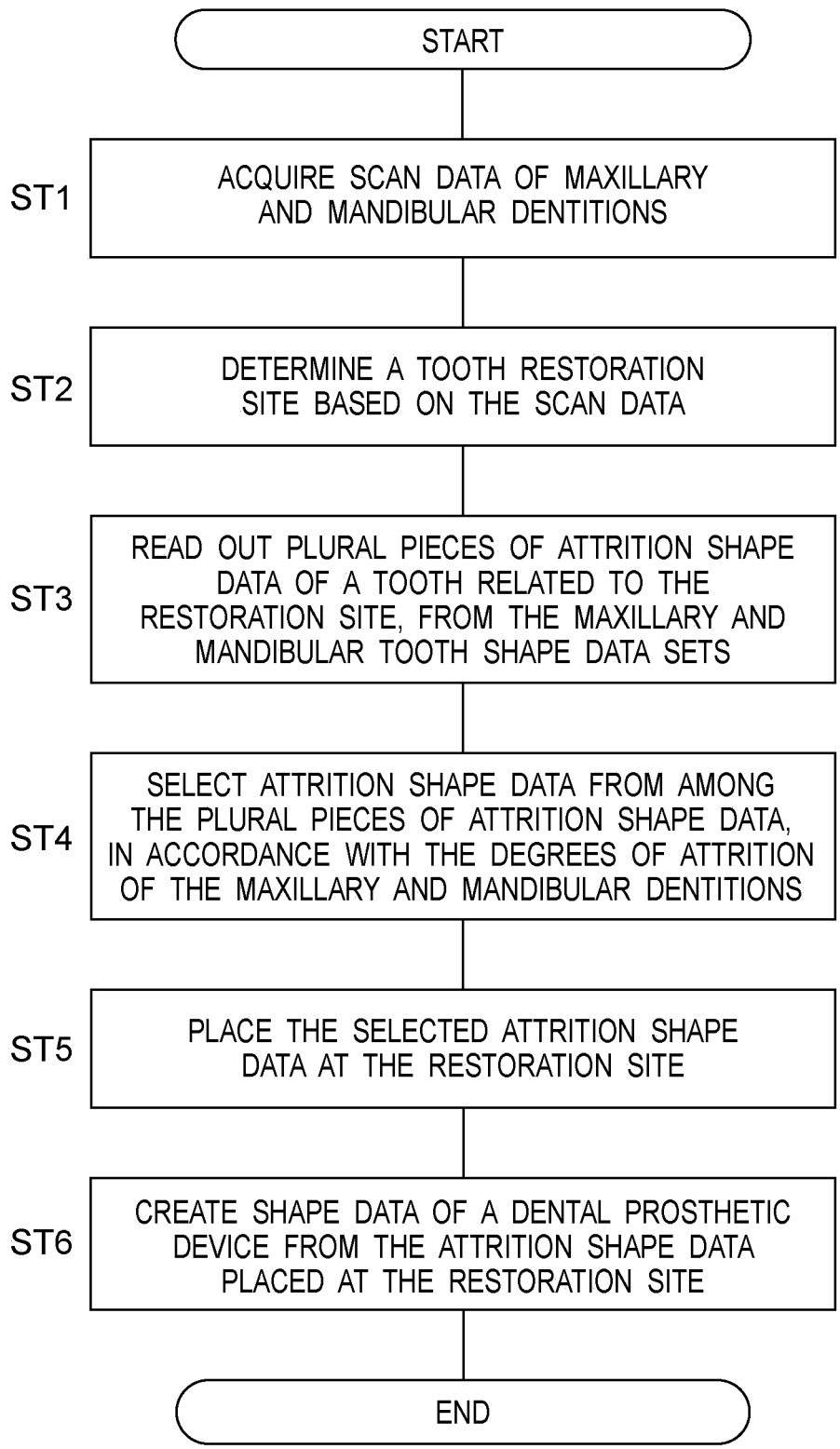
FIG. 19 is a flowchart showing an example of a design method of the first embodiment according to the present invention.

A dental prosthetic device design method will be described. FIG. 19 is a flowchart showing an example of a design method of the first embodiment according to the present invention. As shown in FIG. 19, the method of designing a dental prosthetic device includes an acquisition step ST1, a determination step ST2, a readout step ST3, a selection step ST4, a placement step ST5, and a creation step ST6. The design method is implemented by the design apparatus 20.

The acquisition step ST1 acquires scan data of maxillary and mandibular dentitions. At the acquisition step ST1, the design apparatus 20 acquires scan data of the maxillary and mandibular dentitions from the scanner 10.

The determination step ST2 determines a tooth restoration site based on the scan data. At the determination step ST2, the design apparatus 20 determines a tooth site to be restored, of the maxillary and mandibular dentitions, based on the scan data acquired at the acquisition step ST1. The tooth restoration site is a tooth defect site for example.

For example, the tooth restoration site is determined based on the scan data and information input to the input device 23. Specifically, the design apparatus 20 displays on the display device 24 maxillary and mandibular dentition shape data reproduced based on the scan data. Via the input device 23, the user selects a tooth site to be restored on the maxillary and mandibular dentition shape data. The design apparatus 20 determines the site selected on the maxillary and mandibular dentition shape data as the tooth restoration site.

Alternatively, the design apparatus 20 may automatically determines the tooth restoration site based on the scan data. "Automatically determine" means determining without basing on information input to the input part 23 through the user's operation. For example, the design apparatus 20 may compare reference data of the maxillary and mandibular dentitions with the scan data to detect a tooth defect site so as to determine the defect site as the tooth restoration site.

The readout step ST3 reads out plural pieces of attrition shape data of a tooth related to the restoration site, from the maxillary and mandibular tooth shape data sets having plural pieces of attrition shape data with different degrees of attrition for each tooth of the maxillary and mandibular dentitions. "Plural pieces of attrition shape data of a tooth related the restoration site" mean a tooth lying at the restoration site. At the readout step ST3, the design apparatus 20 identifies a tooth corresponding to the restoration site and reads out plural pieces of attrition shape data of the identified tooth from the storage device 22. For example, if the restoration site is the upper central incisor T1, the design apparatus 20 reads out five pieces of attrition shape data of the upper central incisor T1 at attritions S0 to S4.

The readout step ST3 includes displaying the plural pieces of attrition shape data on the display device 24. For example, if the restoration site is the upper central incisor T1, the design apparatus 20 displays on the display device 24 five pieces of attrition shape data of the upper central incisor T1 at attritions S0 to S4. This allows the user to check the attrition shape data of the tooth lying at the restoration site.

The selection step ST4 selects attrition shape data from among the plural pieces of attrition shape data, in accordance with the degrees of attrition of the maxillary and mandibular dentitions. At the selection step ST4, the design apparatus 20 selects attrition shape data from among the plural pieces of attrition shape data read out at the readout step ST3, in accordance with the degrees of attrition of the maxillary and mandibular dentitions. As a result, attrition shape data matching the patient's degree of attrition can be selected, enabling use of attrition shape data more suited for the patient's intraoral environment.

For example, the design apparatus 20 selects attrition shape data from among the plural pieces of attrition shape data, based on information input to the input device 23. At the readout step ST3, the design apparatus 20 displays plural pieces of attrition shape data on the display device 24. The user selects attrition shape data via the input device 23 from among the plural pieces of attrition shape data displayed on the display device 24. The design apparatus 20 selects attrition shape data from among the plural pieces of attrition shape data, based on input information input to the input part 23 through the user's operation.

The placement step ST5 places the selected attrition shape data at the restoration site. At the placement step ST5, the design apparatus 20 places the attrition shape data selected at the selection step ST4 at the tooth restoration site of the maxillary and mandibular dentitions. The attrition shape data is placed in harmony with the patient's oral cavity at the tooth restoration site of the maxillary and mandibular dentitions.

The creation step ST6 creates shape data of the dental prosthetic device from the attrition shape data placed at the restoration site. At the creation step ST6, the design apparatus 20 creates the shape data of the dental prosthetic device from the attrition shape data placed at the restoration site, based on information input to the input device 23 through the user's operation.

For example, the user operates the input device 23 to set a crown insertion direction, a margin line, and a cement space on the attrition shape data placed at the restoration site, to create surface data of the crown inner surface. Next, using morphing and brushing features of dental CAD software, the attrition shape data placed at the restoration site is deformed to create surface data of the crown outer shape whose occlusal state is in harmony with the patient's oral cavity. Finally, the surface data of the crown outer shape and the surface data of the crown inner surface are connected together to complete a virtual crown design. The shape data of the dental prosthetic device is thus designed.

In this manner, in the dental prosthetic device design method of the first embodiment, the steps ST1 to ST6 are implemented so that the dental prosthetic device shape data is created using attrition shape data that depends on the degrees of attrition of the maxillary and mandibular dentitions.

[Effects]

According to the design method and the design apparatus of the first embodiment of the present invention, the following effects can be achieved.

The dental prosthetic device design method includes the acquisition step ST1, the determination step ST2, the readout step ST3, the selection step ST4, the placement step ST5, and the creation step ST6. The acquisition step ST1 acquires scan data of maxillary and mandibular dentitions. The determination step ST2 determines a tooth restoration site based on the scan data. The readout step ST3 reads out plural pieces of attrition shape data of a tooth related to the restoration site, from the maxillary and mandibular tooth shape data sets having plural pieces of attrition shape data S0 to S4 with different degrees of attrition for each tooth of the maxillary and mandibular dentitions. The selection step ST4 selects attrition shape data from among the plural pieces of attrition shape data, in accordance with the degrees of attrition of the maxillary and mandibular dentitions. The placement step ST5 places the selected attrition shape data at the restoration site. The creation step ST6 creates shape data of the dental prosthetic device from the attrition shape data placed at the restoration site.

By virtue of such a configuration, the dental prosthetic device can be designed based on the attrition shape data selected in accordance with the degrees of attrition. It is hereby possible to reduce the amount of work for designing the dental prosthetic device and to shorten the work time, enabling the dental prosthetic device to be efficiently designed.

The plural pieces of attrition shape data include plural pieces of tooth shape data in which the attrition portion is drilled stepwise from the crown side toward the root side, for each of a plurality of teeth. Such a configuration can accommodate the intraoral environment of various patients. For example, it can handle from the maxillary and mandibular dentitions of a patient with a large degree of attrition to the maxillary and mandibular dentitions of a patient with a small degree of attrition. This makes it possible to design the dental prosthetic device more efficiently.

The maxillary and mandibular tooth shape data sets include maxillary tooth shape data and mandibular tooth shape data. The maxillary tooth shape data includes shape data of the upper central incisor T1, the upper lateral incisor T2, the upper canine T3, the upper first premolar T4, the upper second premolar T5, the upper first molar T6, and the upper second molar T7. The mandibular tooth shape data includes shape data of the lower central incisor T8, the lower lateral incisor T9, the lower canine T10, the lower first premolar T11, the lower second premolar T12, the lower first molar T13, and the lower second molar T14. Such a configuration enables the dental prosthetic device to be designed more efficiently.

The maxillary tooth shape data has plural pieces of attrition shape data for each of the upper central incisor T1, the upper lateral incisor T2, the upper canine T3, the upper first premolar T4, the upper second premolar T5, the upper first molar T6, and the upper second molar T7. In the plural pieces of attrition shape data of the upper central incisor T1, its lingual surface in contact with the opposing tooth is drilled stepwise within the range of 0.00 mm or more and 1.50 mm or less from the crown side toward the root side. In the plural pieces of attrition shape data of the upper lateral incisor T2, its lingual surface in contact with the opposing tooth is drilled stepwise within the range of 0.00 mm or more and 1.50 mm or less from the crown side toward the root side. In the plural pieces of attrition shape data of the upper canine T3, its lingual surface in contact with the opposing tooth is drilled stepwise within the range of 0.00 mm or more and 2.00 mm or less from the crown side toward the root side. In the plural pieces of attrition shape data of the upper first premolar T4, its occlusal surface in contact with the opposing tooth is drilled stepwise within the range of 0.00 mm or more and 2.00 mm or less from the crown side toward the root side. In the plural pieces of attrition shape data of the upper second premolar T5, its occlusal surface in contact with the opposing tooth is drilled stepwise within the range of 0.00 mm or more and 2.00 mm or less from the crown side toward the root side. In the plural pieces of attrition shape data of the upper first molar T6, its occlusal surface in contact with the opposing tooth is drilled stepwise within the range of 0.00 mm or more and 1.50 mm or less from the crown side toward the root side. In the plural pieces of attrition shape data of the upper second molar T7, its occlusal surface in contact with the opposing tooth is drilled stepwise within the range of 0.00 mm or more and 1.50 mm or less from the crown side toward the root side. The mandibular tooth shape data has plural pieces of attrition shape data for each of the lower central incisor T8, the lower lateral incisor T9, the lower canine T10, the lower first premolar T11, the lower second premolar T12, the lower first molar T13, and the lower second molar T14. In the plural pieces of attrition shape data of the lower central incisor T8, its incisal edge in contact with the opposing tooth is drilled stepwise within the range of 0.00 mm or more and 1.50 mm or less from the crown side toward the root side. In the plural pieces of attrition shape data of the lower lateral incisor T9, its incisal edge in contact with the opposing tooth is drilled stepwise within the range of 0.00 mm or more and 1.50 mm or less from the crown side toward the root side. In the plural pieces of attrition shape data of the lower canine T10, its apex in contact with the opposing tooth is drilled stepwise within the range of 0.00 mm or more and 2.00 mm or less from the crown side toward the root side. In the plural pieces of attrition shape data of the lower first premolar T11, its occlusal surface in contact with the opposing tooth is drilled stepwise within the range of 0.00 mm or more and 2.00 mm or less from the crown side toward the root side. In the plural pieces of attrition shape data of the lower second premolar T12, its occlusal surface in contact with the opposing tooth is drilled stepwise within the range of 0.00 mm or more and 2.00 mm or less from the crown side toward the root side. In the plural pieces of attrition shape data of the lower first molar T13, its occlusal surface in contact with the opposing tooth is drilled stepwise within the range of 0.00 mm or more and 1.50 mm or less from the crown side toward the root side. In the plural pieces of attrition shape data of the lower second molar T14, its occlusal surface in contact with the opposing tooth is drilled stepwise within the range of 0.00 mm or more and 1.50 mm or less from the crown side toward the root side. With such a configuration, the design of the dental prosthetic device can be performed more efficiently by setting the attrition portion for each tooth.

The readout step ST3 includes displaying plural pieces of attrition shape data on the display part 24. The selection step ST4 includes selecting attrition shape data from among the plural pieces of attrition shape data, based on input information input to the input device 23 through the user's operation. Such a configuration enables the design of the dental prosthetic device to be performed even more efficiently.

The design apparatus 20 is an apparatus for designing the dental prosthetic device and includes the processor 21 and the storage device 22 that stores instructions executed by the processor 21. The storage device 22 stores the maxillary and mandibular tooth shape data sets having the plural pieces of attrition shape data S0 to S4 with different degrees of attrition for each tooth of the maxillary and mandibular dentitions. The instructions include the acquiring ST1, the deciding ST2, the reading out ST3, the selecting AT4, the placing ST5, and the creating ST6. The acquiring ST1 acquires scan data of the maxillary and mandibular dentitions. The deciding ST2 decides a tooth restoration site based on the scan data. The reading out ST3 reads out plural pieces of attrition shape data of a tooth related to the restoration site, from the maxillary and mandibular tooth shape data sets having plural pieces of attrition shape data S0 to S4 with different degrees of attrition for each tooth of the maxillary and mandibular dentitions. The selecting ST4 selects attrition shape data from among the plural pieces of attrition shape data, in accordance with the degrees of attrition of the maxillary and mandibular dentitions. The placing ST5 places the selected attrition shape data at the restoration site. The creating ST6 creates shape data of the dental prosthetic device from the attrition shape data placed at the restoration site.

With such a configuration, the dental prosthetic device can be designed based on the attrition shape data selected in accordance with the degrees of attrition. It is hereby possible to reduce the amount of work for designing the dental prosthetic device and to shorten the work time, enabling the design of the dental prosthetic device to be efficiently performed.

Although in the first embodiment the example has been described where the maxillary and mandibular tooth shape data sets include the tooth shape data of the upper central incisor T1, the upper lateral incisor T2, the upper canine T3, the upper first premolar T4, the upper second premolar T5, the upper first molar T6, the upper second molar T7, the lower central incisor T8, the lower lateral incisor T9, the lower canine T10, the lower first premolar T11, the lower second premolar T12, the lower first molar T13, and the lower second molar T14, this is not limitative. The maxillary and mandibular tooth shape data sets need only to include attrition shape data of a plurality of teeth of the maxillary and mandibular dentitions. For example, the maxillary and mandibular tooth shape data sets need only to include attrition shape data of one or more of the teeth described above.

Although in the first embodiment the example has been described where the design method includes the acquisition step ST1, the determination step ST2, the readout step ST3, the selection step ST4, the placement step ST5, and the creation step ST6, this is not limitative. In the design method, these steps may be reduced in number, divided, and integrated. Alternatively, the design method may include an additional step(s).

Although in the first embodiment the example has been described where the selection step ST4 selects attrition shape data from among plural pieces of attrition shape data, based on input information input to the input device 23 through the user's operation, this is not limitative. The selection step ST4 may be automatically performed by the design apparatus 20.

Although in the first embodiment the example has been described where at the selection step ST4 the user selects attrition shape data via the input part 23 from among plural pieces of attrition shape data appearing on the display part 24, this is not limitative. For example, information such as age of the patient may be input via the input part 23 so that attrition shape data is selected from among plural pieces of attrition shape data, based on the patient information. Since the attrition of teeth increases with age, the degree of attrition can be estimated based on the patient age information. For this reason, the attrition shape data can be selected from among plural pieces of attrition shape data, based on the patient age information. Although in the first embodiment the design method and the design apparatus have been described by way of example, the present invention is also applicable to a program and a computer-readable recording medium. For example, the program may cause the computer to execute the above design method. The computer-readable recording medium may store a program for causing the computer to execute the above design method.

Second Embodiment

A design method according to a second embodiment of the present invention will be described. In the second embodiment, differences from the first embodiment will be mainly described. In the second embodiment, the same or equivalent components as those in the first embodiment will be described with the same reference numerals. Furthermore, in the second embodiment, the description overlapping with the first embodiment is omitted.

Figure 20:
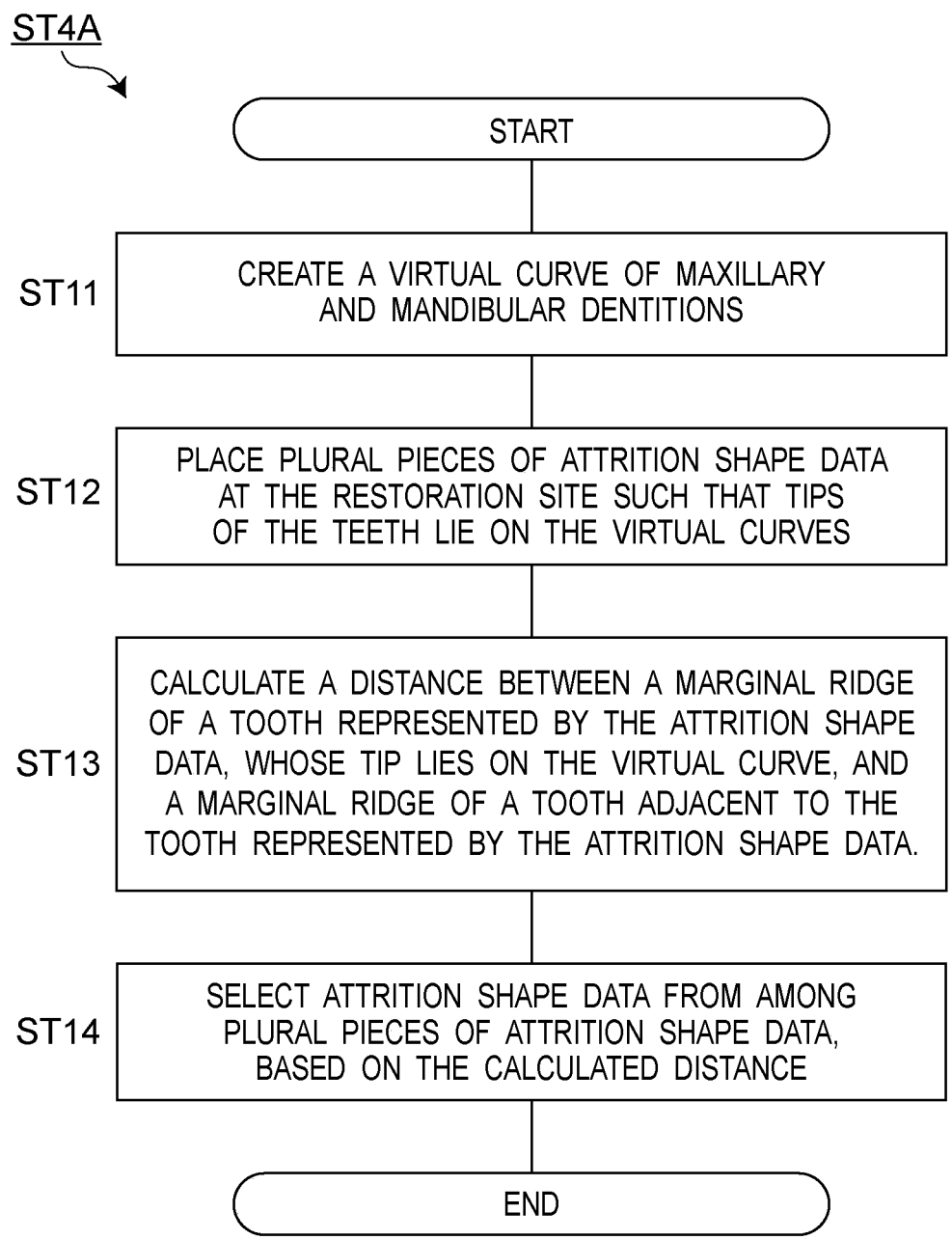
FIG. 20 is a flowchart showing an example of a selection step of a design method of a second embodiment according to the present invention.

An example of the design method of the second embodiment will be described with reference to FIG. 20. FIG. 20 is a flowchart showing an example of a selection step ST4A of the design method of the second embodiment according to the present invention.

The second embodiment differs from the first embodiment in that a virtual curve of the maxillary and mandibular arrangement is created so that attrition shape data is selected from among plural pieces of attrition shape data based on the virtual curve.

As shown in FIG. 20, the selection step ST4A in the second embodiment includes a step ST11 creating the virtual curve and steps ST12 to ST14 selecting attrition shape data from among plural pieces of attrition shape data.

The step ST11 creates a virtual curve joining the tips of a plurality of teeth when the maxillary and mandibular dentitions are viewed from the lateral side. Specifically, the step ST11 creates a virtual curve joining the buccal molar and premolar cusp apexes, the canine apex, and the incisor incisal edges when the maxillary and mandibular dentitions are viewed from the lateral side. At the step ST11, the design apparatus 20 detects the buccal molar and premolar cusp apexes, the canine apex, and the incisor incisal edges when the maxillary and mandibular dentitions are viewed from the lateral side, based on scan data of the patient's maxillary and mandibular dentitions, and creates a curve joining them to thereby create a virtual curve. In the second embodiment, the design apparatus 20 creates the virtual curve for each of the maxillary dentition and the mandibular dentitions.

Figure 21:
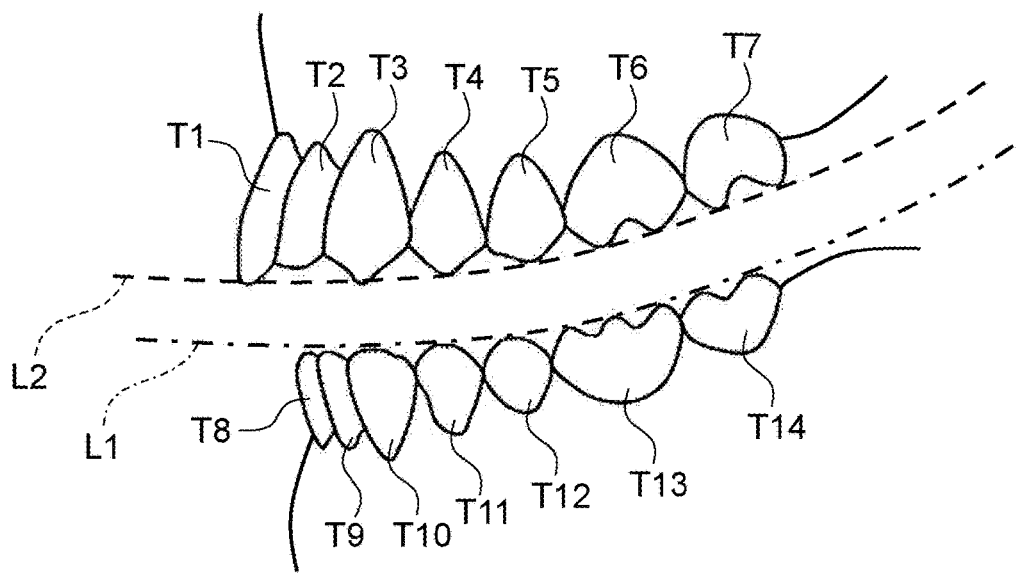
FIG. 21 is a schematic view for explaining virtual curves.

FIG. 21 is a schematic view for explaining virtual curves L1 and L2. As shown in FIG. 21, the virtual curve L1 is a curve joining the buccal molar and premolar cusp apexes, the canine apex, and the incisor incisal edges on the lower jaw when the maxillary and mandibular dentitions are viewed from the lateral side. Specifically, the virtual curve L1 is a curve joining the incisal edge of the lower central incisor T8, the incisal edge of the lower lateral incisor T9, the apex of the lower canine T10, the buccal cusp apex of the lower first premolar T11, the buccal cusp apex of the lower second premolar T12, the buccal cusp apex of the lower first molar T13, and the buccal cusp apex of the lower second molar T14. The virtual curve L2 is a curve joining the buccal molar and premolar cusp apexes, the canine apex, and the incisor incisal edges on the upper jaw when the maxillary and mandibular dentitions are viewed from the lateral side. Specifically, the virtual curve L2 is a curve joining the incisal edge of the upper central incisor T1, the incisal edge of the upper lateral incisor T2, the apex of the upper canine T3, the buccal cusp apex of the upper first premolar T4, the buccal cusp apex of the upper second premolar T5, the buccal cusp apex of the upper first molar T6, and the buccal cusp apex of the upper second molar T7.

The virtual curve L1 is used when the restoration site lies in the mandibular dentition. The virtual curve L2 is used when the restoration site lies in the maxillary dentition. The virtual curves L1 and L2 change in accordance with the degrees of attrition of the maxillary and mandibular dentitions.

The step ST12 places plural pieces of attrition shape data at the restoration site such that the tips of the teeth lie on the virtual curves L1 and L2. At the step ST12, the design apparatus 20 places plural pieces of attrition shape data at the restoration site such that the tooth tips are arranged on the virtual curves L1 and L2. In the mandibular dentition, the tooth tips correspond to the incisal edge of the lower central incisor T8, the incisal edge of the lower lateral incisor T9, the apex of the lower canine T10, the buccal cusp apex of the lower first premolar T11, the buccal cusp apex of the lower second premolar T12, the buccal cusp apex of the lower first molar T13, and the buccal cusp apex of the lower second molar T14. In the maxillary dentition, the tooth tips correspond to the incisal edge of the upper central incisor T1, the incisal edge of the upper lateral incisor T2, the apex of the upper canine T3, the buccal cusp apex of the upper first premolar T4, the buccal cusp apex of the upper second premolar T5, the buccal cusp apex of the upper first molar T6, and the buccal cusp apex of the upper second molar T7.

For example, if the restoration site is the lower second premolar T12, plural pieces of attrition shape data of the lower second premolar T12 are placed at the restoration site such that the buccal cusp apex of the lower second premolar T12 lies on the virtual curve L1.

The step ST13 calculates a distance between a marginal ridge of a tooth represented by the attrition shape data, whose tip lies on the virtual curve L1 or L2, and the marginal ridge of a tooth adjacent to the tooth represented by the attrition shape data. At the step ST13, the design apparatus 20 calculates, in the maxillary and mandibular dentitions, a vertical distance between the marginal ridge of a tooth represented by the attrition shape data and the marginal ridge of an adjacent tooth. The adjacent tooth means a tooth lying on at least one side of the attrition shape data.

The step ST14 selects attrition shape data from among plural pieces of attrition shape data, based on the calculated distance. At the step ST14, the design apparatus 20 determines whether or not the calculated distance falls within a predetermined range. That is, the design apparatus 20 determines whether or not the distance is a first threshold value Q1 or more and a second threshold value Q2 or less. For example, the first threshold value Q1 is −0.5 mm and the second threshold value Q2 is +0.5 mm. The distance is "positive" when the marginal ridge of a tooth represented by the attrition shape data is placed lower than the marginal ridge of an adjacent tooth, whereas the distance is "negative" when the marginal ridge of the tooth represented by the attrition shape data is placed higher than the marginal ridge of the adjacent tooth.

The values of the first threshold value Q1 and the second threshold value Q2 described above are examples and are not limited thereto. The first threshold value Q1 and the second threshold value Q2 can be set to arbitrary values. The values of the first threshold value Q1 and the second threshold value Q2 may differ depending on the type of tooth, the case of the patient, and the like. In the design of a prosthesis such as a crown, it is required to align the height in the vertical direction with the marginal ridge of the adjacent tooth. By equalizing the heights, it is possible to prevent food pieces, etc. from being press-fitted between the teeth. By setting the threshold values, the effect can be achieved that adjustments for leveling the heights of the marginal ridges of adjacent teeth are minimized.

At the step ST14, the design apparatus 20 selects attrition shape data in which the distance has been determined to be within a predetermined range.

The steps ST12 to ST14 are carried out for each of the plural pieces of attrition shape data S0 to S4. This enables attrition shape data matching the degrees of attrition of the maxillary and mandibular dentitions to be selected from among the plural pieces of attrition shape data S0 to S4.

Figure 22:
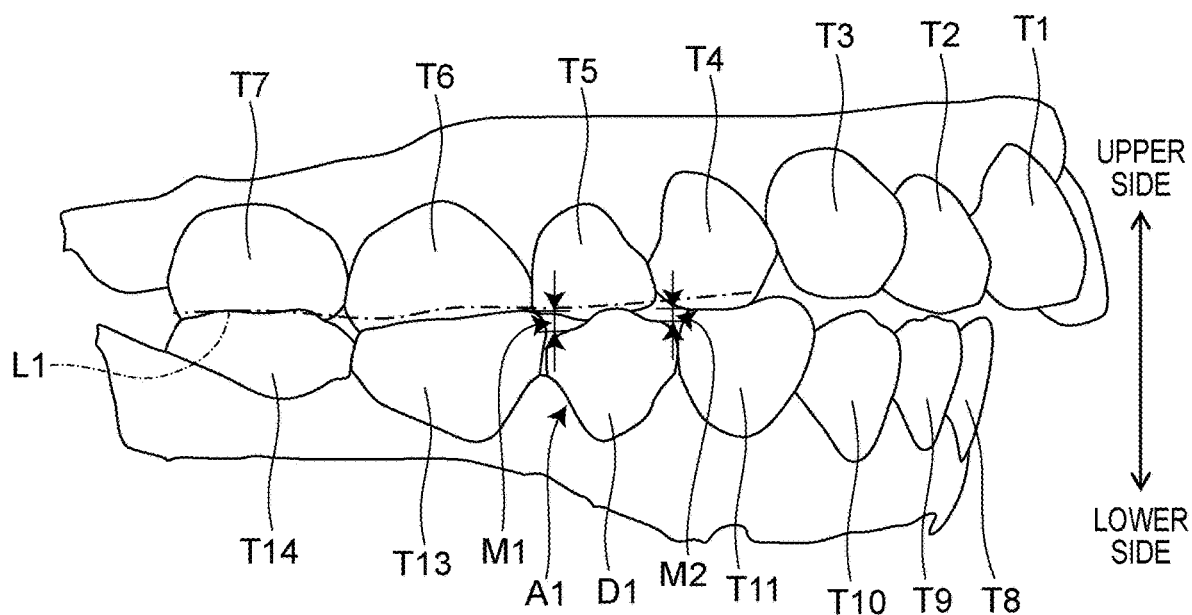
FIG. 22 is a schematic view for explaining an example of attrition shape data selection that is based on the virtual curve.

FIG. 22 is a schematic view for explaining an example of the attrition shape data selection that is based on the virtual curve L1. FIG. 22 shows an example in which a restoration site A1 is the lower second premolar T12. In FIG. 22, first attrition shape data D1 of the lower second premolar T12 is placed at the restoration site A1. The first attrition shape data D1 has a shape of the lower second premolar T12 with its attrition portion drilled. The steps S13 and S14 will hereinafter be described with reference to FIG. 22.

As shown in FIG. 22, the first attrition shape data D1 of the lower second premolar T12 is placed at the restoration site A1 with its buccal cusp apex placed on the virtual curve L1. The tooth represented by the first attrition shape data has a first marginal ridge lying toward the lower first premolar T11 and a second marginal ridge lying toward the lower first molar T13. At the step ST13, the design apparatus 20 calculates a vertical distance M2 between the first marginal ridge of the tooth represented by the first attrition shape data D1 and the marginal ridge of the lower first premolar T11 in the mandibular dentition. The design apparatus 20 calculates a vertical distance M1 between the second marginal ridge of the tooth represented by the first attrition shape data D1 and the marginal ridge of the lower first molar T13 in the mandibular dentition.

Figure 23:
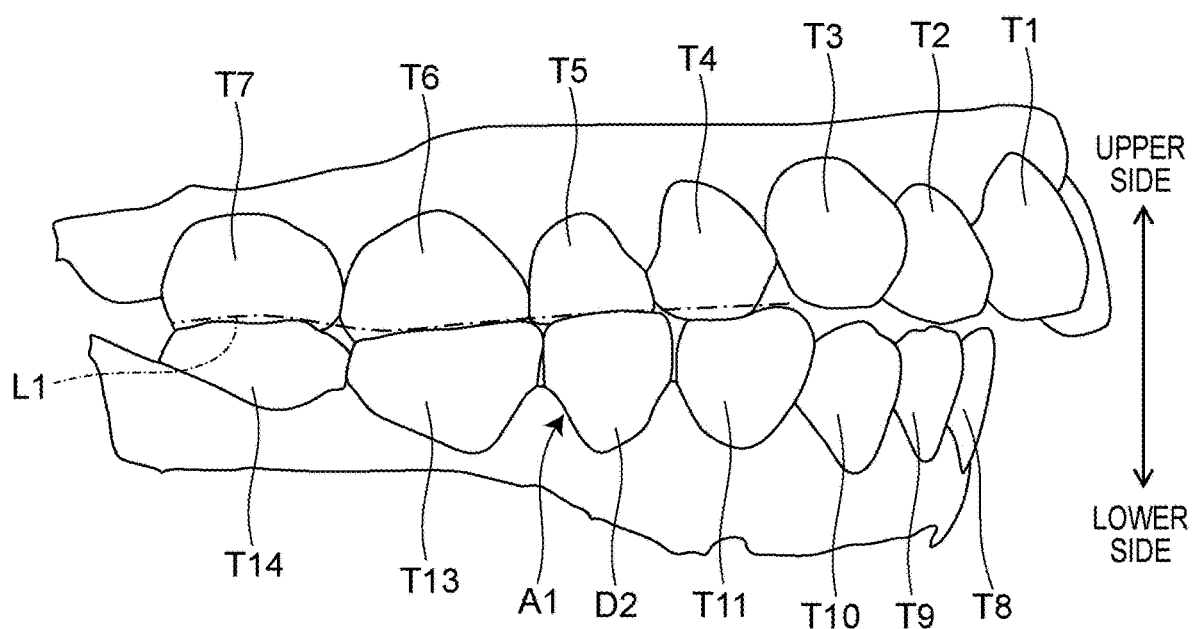
FIG. 23 is a schematic view showing an example of attrition shape data selected from among plural pieces of attrition shape data in the design method of the second embodiment according to the present invention.

FIG. 23 is a schematic view showing an example of attrition shape data selected from among plural pieces of attrition shape data in the design method of the second embodiment according to the present invention. In FIG. 23, second attrition shape data D2 of the lower second premolar T12 is placed at the restoration site A1. The second attrition shape data D2 has a shape of the lower second premolar T12 with its attrition portion drilled.

As shown in FIG. 23, at the step ST14, the design apparatus 20 selects the second attrition shape data having the distances M1 and M2 determined to be within the predetermined range, from among the plural pieces of attrition shape data. That is, the design apparatus 20 selects attrition shape data having the distances M1 and M2 equal to or greater than the first threshold value Q1 and equal to or less than the second threshold value Q2, from among the plural pieces of attrition shape data.

In this manner, at the selection step ST4A of the dental prosthetic device design method of the second embodiment, attrition shape data in accordance with the degrees of attrition of the maxillary and mandibular dentitions is selected by carrying out the steps ST11 to ST14.

[Effects]

According to the design method of the second embodiment of the present invention, the following effects can be achieved.

In the dental prosthetic device design method of the second embodiment, the selection step ST4A includes the step ST11 creating the virtual curves L1 and L2 and the steps ST12 to ST14 selecting attrition shape data from among plural pieces of attrition shape data, based on the virtual curves L1 and L2. The step ST11 creating the virtual curves L1 and L2 creates the virtual curves L1 and L2 joining the buccal molar and premolar cusp apexes, the canine apex, and the incisor incisal edges when the maxillary and mandibular dentitions are viewed from the lateral side.

With such a configuration, the attrition shape data can be easily selected from among the plural pieces of attrition shape data, in accordance with the degrees of attrition of the maxillary and mandibular dentitions. This makes it possible to reduce the amount of work for designing the dental prosthetic device and to shorten the work time, enabling the dental prosthetic device to be designed more efficiently.

The steps ST12 to ST14 selecting attrition shape data from among plural pieces of attrition shape data based on the virtual curves L1 and L2 include the placement step ST12, the calculation step ST13, and the selection step S14. The placement step ST12 places plural pieces of attrition shape data at the restoration site such that the tooth tips lie on the virtual curves L1 and L2. The calculation step ST13 calculates, for the plural pieces of attrition shape data, the distances M1 and M2 between the marginal ridge of a tooth represented by the attrition shape data, whose tip lies on the virtual curve L1 or L2, and the marginal ridges of teeth adjacent to the tooth represented by the attrition shape data. The selection step ST14 selects attrition shape data from among the plural pieces of attrition shape data, based on the calculated distances M1 and M2. With such a configuration, the attrition shape data can be more easily selected from among plural pieces of attrition shape data, in accordance with the degrees of attrition of the maxillary and mandibular dentitions. This makes it possible to perform the design of the dental prosthetic device even more efficiently.

Although in the second embodiment the example has been described where the selection step ST4A includes the steps ST11 to ST14, this is not limitative. At the selection step ST4A, these steps ST11 to ST14 may be reduced in number, divided, and integrated. Alternatively, the selection step ST4A may include an additional step(s).

Although in the second embodiment the example has been described where at the step ST13, two distances M1 and M2 from the marginal ridges of teeth adjacent on both sides on the attrition shape data are calculated and where at the step ST14, attrition shape data is selected based on the two distances M1 and M2, the present invention is not limited thereto. For example, the step ST13 may calculate one distance from the marginal ridge of a tooth adjacent on one side on the attrition shape data. The step ST14 may select one piece of attrition shape data from among the plural pieces of attrition shape data, based on the one distance. Even in such a configuration, attrition shape data can be easily selected from among the plural pieces of attrition shape data, in accordance with the degrees of attrition of the maxillary and mandibular dentitions.

Third Embodiment

A design method according to a third embodiment of the present invention will be described. In the third embodiment, differences from the second embodiment will be mainly described. In the third embodiment, the same or equivalent components as those in the second embodiment will be described with the same reference numerals. Furthermore, in the third embodiment, the description overlapping with the second embodiment is omitted.

Figure 24:
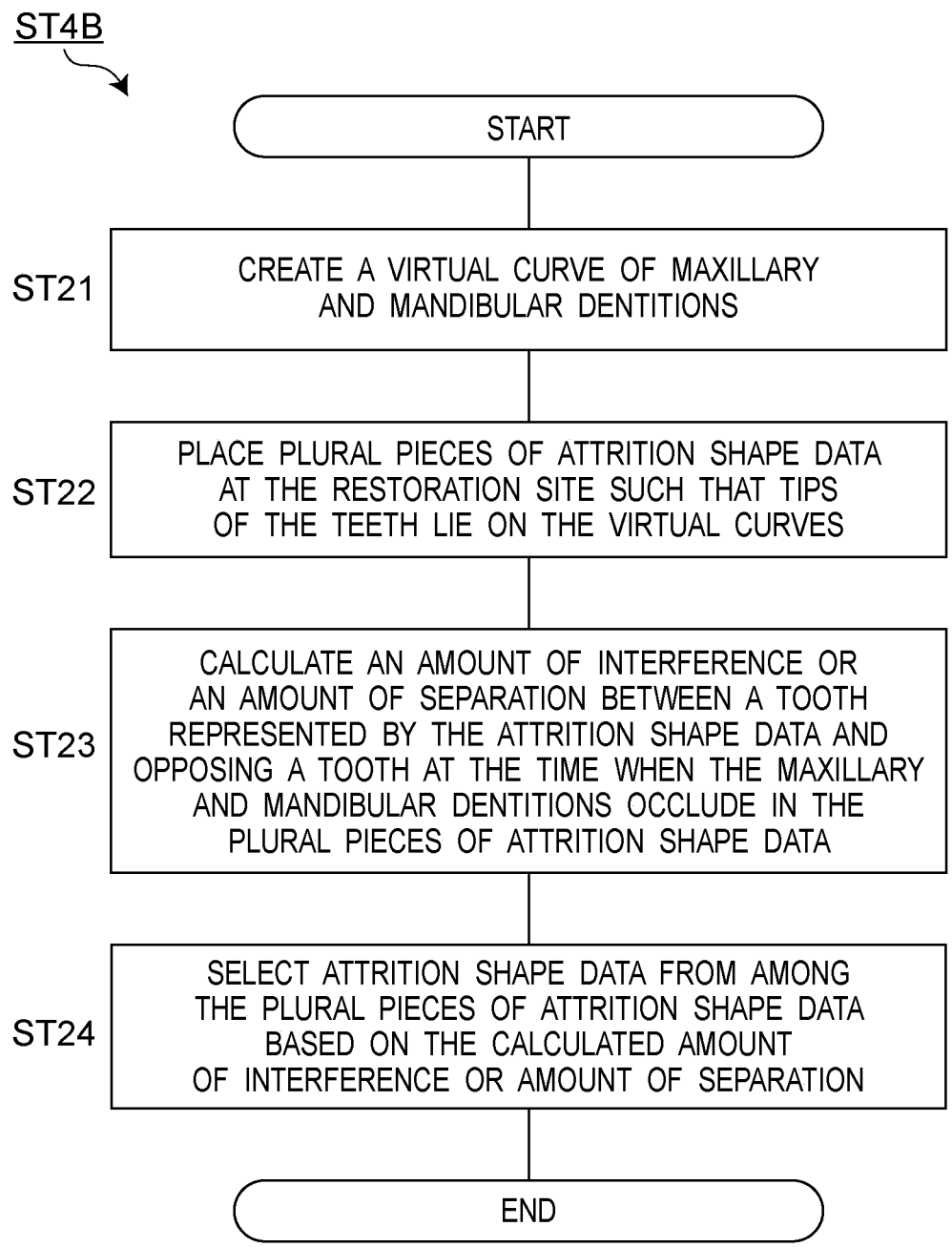
FIG. 24 is a flowchart showing an example of a selection step of a design method of a third embodiment according to the present invention.

An example of a design method of the third embodiment will be described with reference to FIG. 24. FIG. 24 is a flowchart showing an example of a selection step ST4B of the design method of the third embodiment according to the present invention.

The third embodiment differs from the second embodiment in that attrition shape data is selected from among plural pieces of attrition shape data, based on the amount of interference or the amount of separation between a tooth represented by attrition shape data and an opposing tooth at the time when the maxillary dentition and the mandibular dentition occlude in the plural pieces of attrition shape data.

As shown in FIG. 24, the selection step ST4B of the third embodiment includes a step ST21 creating virtual curves and steps ST22 to ST24 selecting attrition shape data from among plural pieces of attrition shape data, based on the virtual curves L1 and L2. The steps ST21 and ST22 of the third embodiment are the same as the steps ST11 and ST12 of the second embodiment, and therefore they will not be again described.

The step ST23 calculates the amount of interference or the amount of separation between a tooth represented by attrition shape data and an opposing tooth at the time when the maxillary dentition and the mandibular dentition occlude in the plural pieces of attrition shape data. At the step ST23, the design apparatus 20 calculates the amount of interference or the amount of separation between the tooth represented by attrition shape data and the opposing tooth at the time when the maxillary dentition and the mandibular dentition occlude. The amount of interference means the amount by which a maxillary dentition tooth overlaps with a mandibular dentition tooth in the vertical direction of the maxillary and mandibular dentitions when the maxillary dentition and the mandibular dentition occlude. The amount of separation means the amount by which a maxillary dentition tooth and a mandibular dentition tooth separate from each other in the vertical direction of the maxillary and mandibular dentitions when the maxillary dentition and the mandibular dentition occlude.

The step ST24 selects attrition shape data from among plural pieces of attrition shape data, based on the amount of interference or the amount of separation calculated. At the step ST24, the design apparatus 20 determines whether or not the amount of interference or the amount of separation calculated falls within a predetermined range in the plural pieces of attrition shape data. That is, the design apparatus 20 determines whether or not the amount of interference or the amount of separation is equal to or less than a threshold value Q3. For example, the threshold value Q3 is 0.5 mm.

The above-described value of the threshold value Q3 is an exemplification and is not limitative. The threshold value Q3 can be set to any value. The value of the threshold value Q3 may differ depending on the type of tooth. Furthermore, the threshold value of the amount of interference and the threshold value of the amount of separation may differ.

Figure 25:
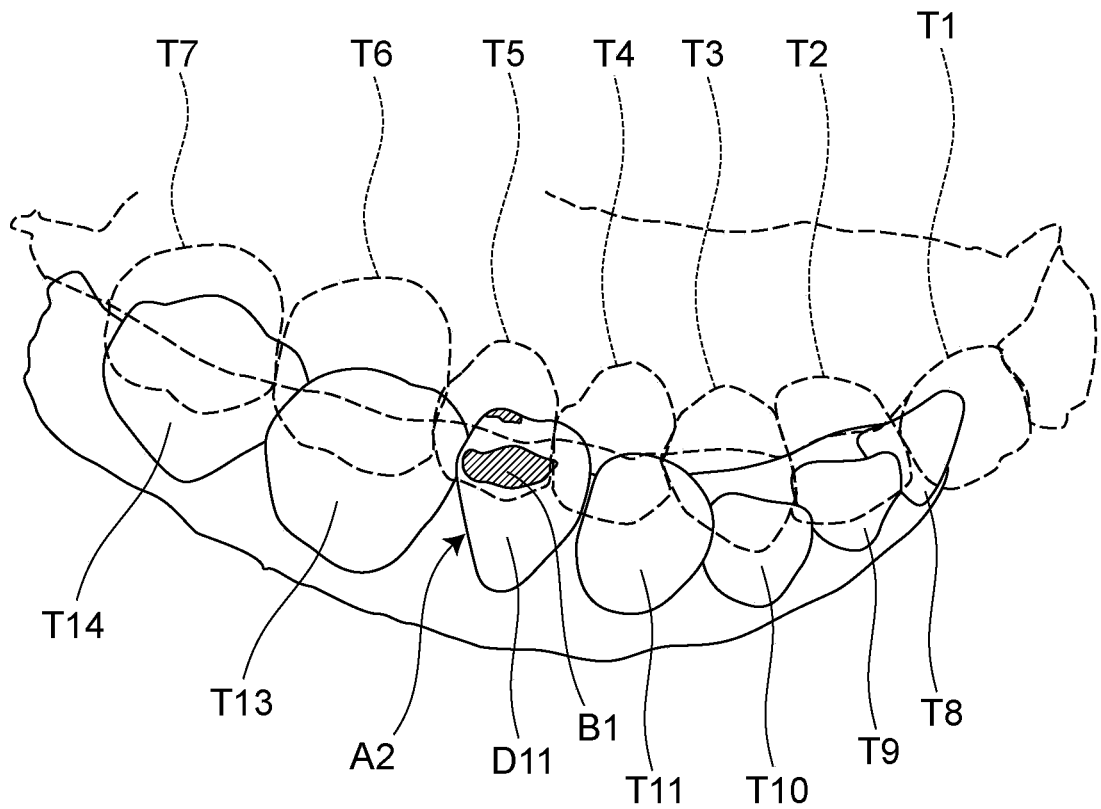
FIG. 25 is a schematic view for explaining an example of attrition shape data selection based on the amount of interference.

FIG. 25 is a schematic view for explaining an example of selection of attrition shape data based on the amount of interference. FIG. 25 shows an example where a restoration site A2 is the lower second premolar T12. In FIG. 25, first attrition shape data D11 of the lower second premolar T12 is placed at the restoration site A2. The first attrition shape data D11 has a shape of the lower second premolar T12 with its attrition portion drilled. The steps ST23 and ST24 will hereinafter be described with reference to FIG. 25.

As shown in FIG. 25, the first attrition shape data D11 of the lower second premolar T12 is placed at the restoration site A2 with its buccal cusp apex lying on a virtual curve. The tooth represented by the first attrition shape data D11 interferes with the upper second premolar T5 that is an opposing tooth, in an interference region B1.

Figure 26:
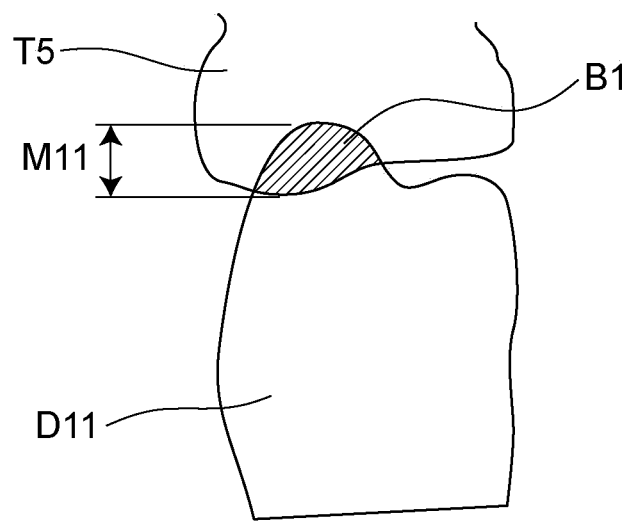
FIG. 26 is a schematic view for explaining an example of the amount of interference between a tooth represented by attrition shape data and an opposing tooth.

FIG. 26 is a schematic view for explaining an example of the amount of interference between the tooth represented by the attrition shape data and the opposing tooth. As shown in FIG. 26, the amount of interference M11 means the length of a portion of the interference region B1 having a maximum thickness in the vertical direction of the maxillary and mandibular dentitions when the maxillary and mandibular dentitions are viewed from the lateral side. At the step ST23, the design apparatus 20 calculates the amount of interference M11 between the tooth represented by the first attrition shape data D11 and the opposing tooth.

Figure 27:
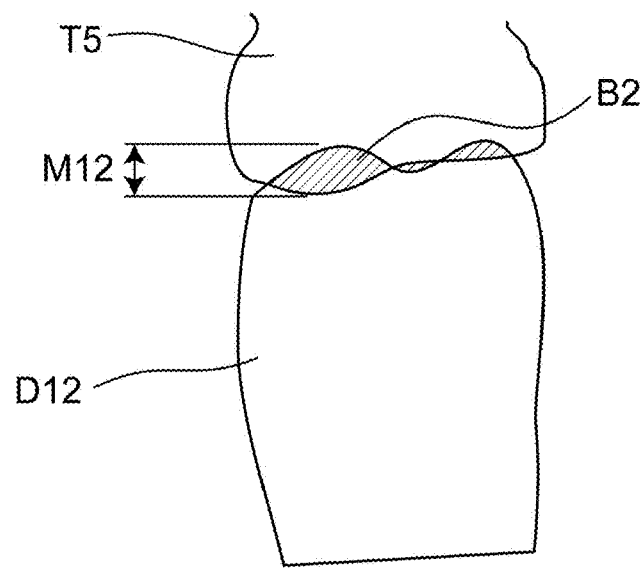
FIG. 27 is a schematic view showing an example of attrition shape data selected from among plural pieces of attrition shape data in the design method of the third embodiment according to the present invention.

FIG. 27 is a schematic view showing an example of attrition shape data selected from among plural pieces of attrition shape data in the design method of the third embodiment according to the present invention. In FIG. 27, the tooth represented by second attrition shape data D12 interferes with the upper second premolar T5 that is an opposing tooth thereof, in an interference region B2.

As shown in FIG. 27, at the step ST24, the design apparatus 20 selects the second attrition shape data D12 having the amount of interference M12 determined to be within a predetermined range from among plural pieces of attrition shape data. That is, the design apparatus 20 selects the second attrition shape data D12 having the amount of interference M12 equal to or less than the threshold value Q3 from among the plural pieces of attrition shape data.

[Effects]

According to the design method of the first embodiment of the present invention, the following effects can be achieved.

In the dental prosthetic device design method of the third embodiment, the selection step ST4B includes the step ST21 creating the virtual curves L1 and L2 and the steps ST22 to ST24 selecting attrition shape data from among plural pieces of attrition shape data, based on the virtual curves L1 and L2. The step ST21 creating the virtual curves L1 and L2 creates the virtual curves L1 and L2 joining the buccal molar and premolar cusp apexes, the canine apex, and the incisor incisal edges when the maxillary and mandibular dentitions are viewed from the lateral side. The steps ST22 to ST24 selecting attrition shape data from among plural pieces of attrition shape data based on the virtual curves L1 and L2 include the placement step ST22, the calculation step ST23, and the selection step S24. The placement step ST22 places plural pieces of attrition shape data at the restoration site such that the tooth tips lie on the virtual curves L1 and L2. The calculation step ST23 calculates the amount of interference or the amount of separation between the tooth represented by the attrition shape data and the opposing tooth at the time when the maxillary and mandibular dentitions occlude in the plural pieces of attrition shape data. The selection step ST24 selects attrition shape data from among the plural pieces of attrition shape data, based on the amount of interference or the amount of separation calculated.

With such a configuration, the attrition shape data can be easily selected from among plural pieces of attrition shape data, in accordance with the degrees of attrition of the maxillary and mandibular dentitions. This makes it possible to reduce the amount of work for designing the dental prosthetic device and to shorten the work time, to consequently enable the dental prosthetic device to be designed even more efficiently.

The step ST24 selecting attrition shape data from among plural pieces of attrition shape data based on the calculated amount of interference or amount of separation selects attrition shape data having the amount of interference or the amount of separation equal to or less than 0.5 mm. With such a configuration, the attrition shape data can be selected more easily from among plural pieces of attrition shape data, in accordance with the degrees of attrition of the maxillary and mandibular dentitions. This makes it possible to perform the design of the dental prosthetic device even more efficiently.

EXAMPLES

The dental prosthetic device design method will further be described based on Examples, but the present invention is not restricted by Examples shown below.

[Evaluation of Usefulness of Tooth Shape Data with Different Degrees of Attrition in Clinical Techniques]

Shape data of a dental prosthetic device was designed using Examples 1 and 2 and Comparative Examples 1 and 2. Examples 1 and 2 used the design apparatus 20 of the first embodiment to design the shape data of a dental prosthetic device. In Examples 1 and 2, the dental prosthetic device shape data was designed using maxillary and mandibular tooth shape data sets having plural pieces of attrition shape data with different degrees of attrition for each of teeth of maxillary and mandibular dentitions. In Examples 1 and 2, use was made of the maxillary and mandibular tooth shape data sets shown in FIG. 18. The Comparative Examples 1 and 2 used CAD software (Dental System 2018.2.0, 3 Shape Inc., Denmark) to design the dental prosthetic device shape data. In Comparative Examples 1 and 2, the dental prosthetic device shape data was designed using maxillary and mandibular tooth shape data (VITA tooth shape data) not considering the attritions.

In Example 1 and Comparative Example 1, the shape data of the crown of the upper first molar T6 was designed. In Example 2 and Comparative Example 2, the shape data of the crown of the lower first molar T13 was designed. In Example 1, the crown was designed under the same conditions as in Comparative Example 1 except that the design was performed using the attrition shape data. In Example 2, the crown was designed under the same conditions as in Comparative Example 2 except that the design was performed using the attrition shape data.

Figure 28:
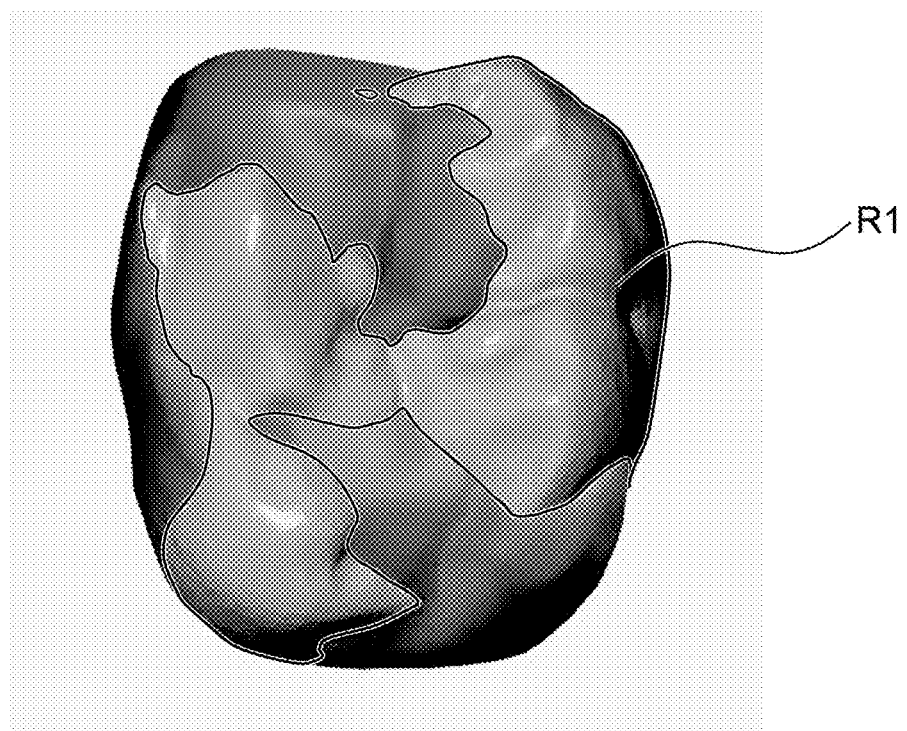
FIG. 28 is a view showing an example of the surface deviation analysis result of Comparative Example 1.
Figure 29:
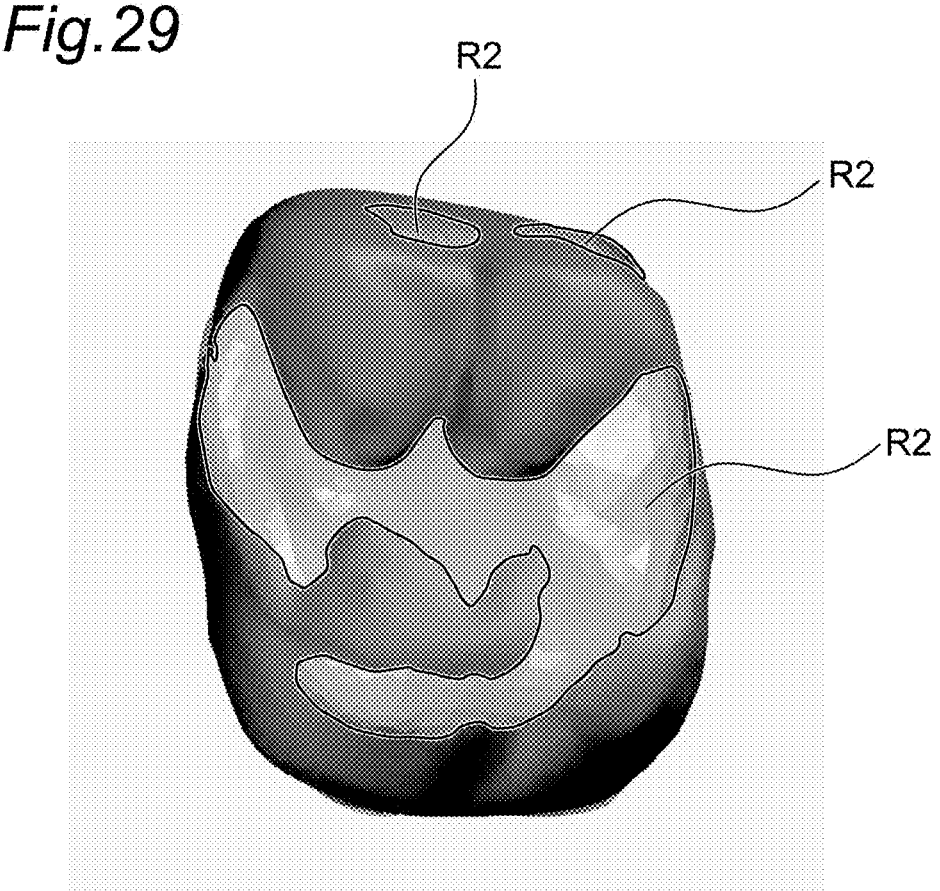
FIG. 29 is a view showing an example of the surface deviation analysis result of Example 1.
Figure 30:
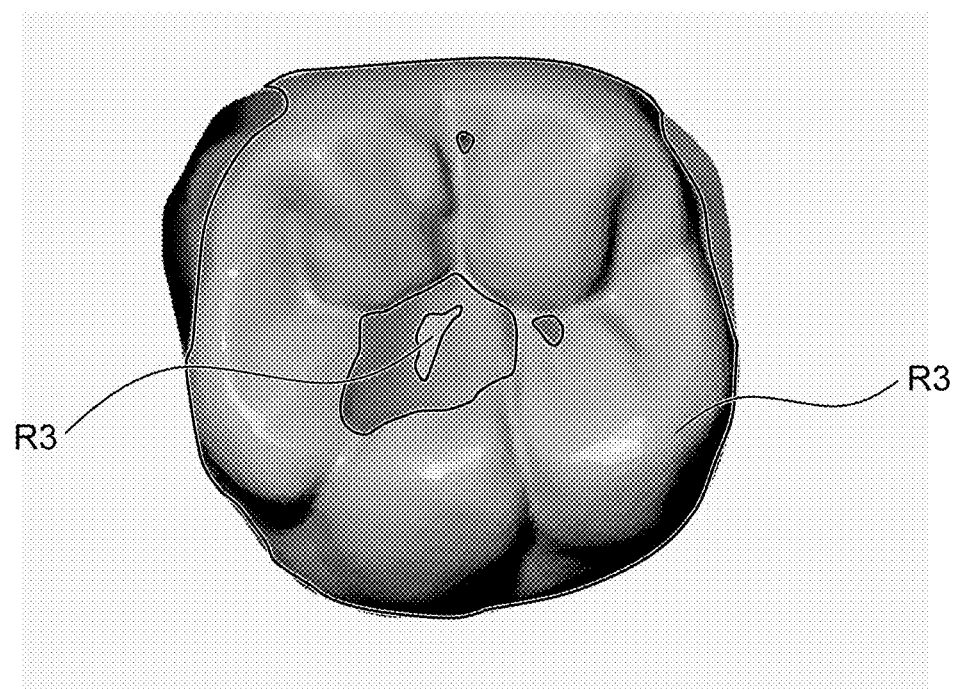
FIG. 30 is a view showing an example of the surface deviation analysis result of Comparative Example 2.
Figure 31:
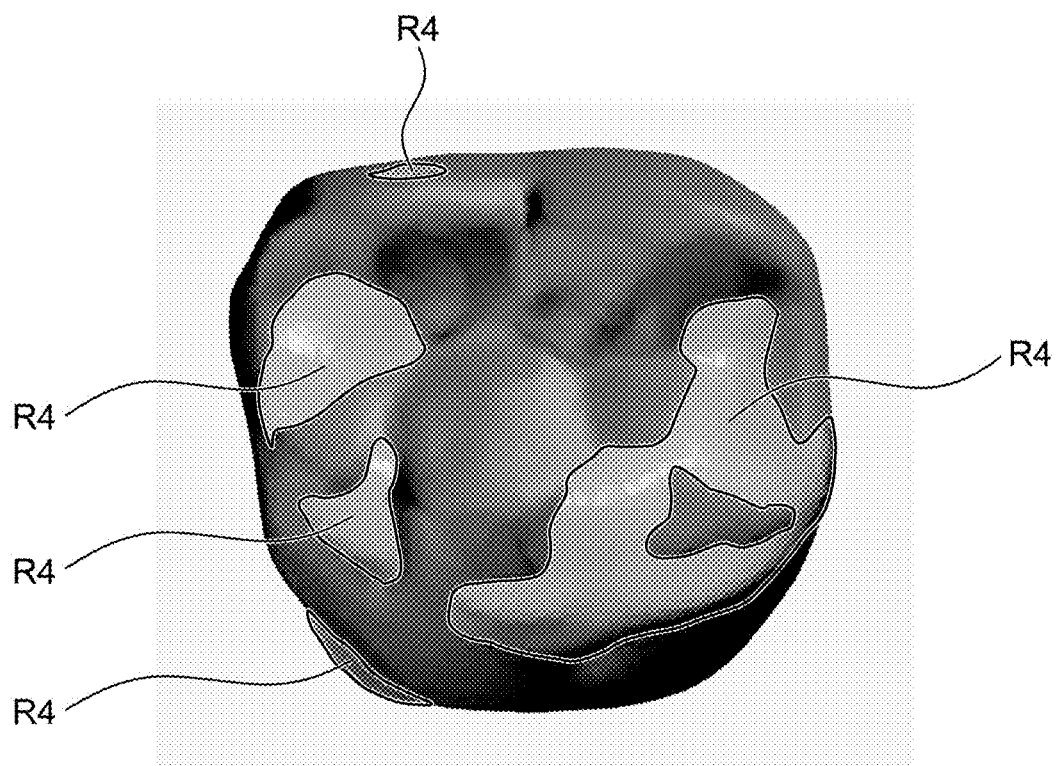
FIG. 31 is a view showing an example of the surface deviation analysis result of Example 2.

The thus designed data is subjected to a shape alignment with scan data of a wax pattern on a crown made by a dental technician with 10 years of experience and then to a 3D surface deviation analysis. Hereinafter, the scan data of the wax pattern on the crown made by the dental technician with 10 years of experience is referred to as "reference data". The results of the surface deviation analysis are shown in FIGS. 28 to 31 and Tables 1 and 2. FIG. 28 is a view showing an example of the surface deviation analysis result of Comparative Example 1. FIG. 29 is a view showing an example of the surface deviation analysis result of Example 1. FIG. 30 is a view showing an example of the surface deviation analysis result of Comparative Example 2. FIG. 31 is a view showing an example of the surface deviation analysis result of Example 2. In the following description, Example 1 and Comparative Example 1 will be referred to as Case 1, and Example 2 and Comparative Example 2 will be referred to as Case 2. The surface deviation analysis was performed using GOM Inspect 2017 manufactured by GOM. The design time in Tables 1 and 2 means the time needed to create the shape data of the crown that is a dental prosthetic device.

TABLE 1

| Case 1 | Arithmetic Average of 3D Surface Deviation Analysis (mm) | Standard Deviation (mm) | Design Time (min) |
|---|---|---|---|
| Comparative Example 1 | 0.03 | 0.64 | 7 |
| Example 1 | −0.16 | 0.36 | 5 |

TABLE 2

| Case 2 | Arithmetic Average of 3D Surface Deviation Analysis (mm) | Standard Deviation (mm) | Design Time (min) |
|---|---|---|---|
| Comparative Example 2 | 0.26 | 0.59 | 7 |
| Example 2 | 0.07 | 0.39 | 5 |

In FIG. 28, a region R1 represents a deviated portion when comparing the shape of the crown designed in Comparative Example 1 and the shape of the crown of the reference data. In FIG. 29, a region R2 represents a deviated portion when comparing the shape of the crown designed in Example 1 and the shape of the crown of the reference data. The deviated portion means a portion that is bulged and/or a portion that is dented as compared with the reference data. As shown in FIGS. 28 and 29, the region R2 of Example 1 is smaller than the region R1 of Comparative Example 1. As shown in Table 1, Example 1 is smaller in standard deviation than Comparative Example 1. In this manner, it can be seen that Example 1 has a shape approximate to the wax pattern of the crown made by the dental technician, as compared with Comparative Example 1. Furthermore, Example 1 was able to reduce the design time as compared with Comparative Example 1. In the industrial world including the dental industry, it is said that 15% or more reduction in work (design) time is of significance. Since in Example 1 the design time is reduced by 15% or more as compared with Comparative Example 1, it can be considered that efficient design of a prosthesis has been achieved.

In FIG. 30, a region R3 represents a deviated portion when comparing the shape of the crown designed in Comparative Example 2 and the shape of the crown of the reference data. In FIG. 31, a region R4 represents a deviated portion when comparing the shape of the crown designed in Example 2 and the shape of the crown of the reference data. As shown in FIGS. 30 and 31, the region R4 of Example 2 is smaller than the region R3 of Comparative Example 2. As shown in Table 2, in the arithmetic average of the 3D surface deviation analysis and the standard deviation, Example 2 is smaller than Comparative Example 2. In this manner, it can be seen that Example 2 has a shape approximate to the wax pattern of the crown made by the dental technician, as compared with Comparative Example 2. Furthermore, Example 2 was able to reduce the design time as compared with Comparative Example 2. Since also in Example 2 the design time is reduced by 15% or more as compared with Comparative Example 2, it can be considered that efficient design of a prosthesis has been achieved.

From the above, Examples 1 and 2 can design a dental prosthetic device having higher compatibility as compared with Comparative Examples 1 and 2. Examples 1 and 2 can design shape data of a dental prosthetic device efficiently with reduced design time, as compared with Comparative Examples 1 and 2.

Although the present invention has been fully described in relation to the preferred embodiments with reference to the accompanying drawings, various modifications or alterations are apparent to those skilled in the art. Such modifications or alterations should be understood as being included therein without departing from the scope of the present invention defined by the appended claims.

INDUSTRIAL APPLICABILITY

A dental prosthetic device design method according to the invention can easily and efficiently design a dental prosthetic device for patients whose tooth shape has changed due to age-related change such as attrition, using a computer. Accordingly, it is useful for improvement in quality and homogenization of dental prosthetic devices in the dental field.

EXPLANATIONS OF LETTERS OR NUMERALS 1 producing system
10 scanner
20 design apparatus
21 processor
22 storage device
23 input device
24 display device
30 machining apparatus
A1, A2 restoration site
B1 interference region
D1, D2, D11, D12 attrition shape data
L1, L2 virtual curve
M1, M2 distance
M11, M12 amount of interference
T1 upper central incisor
T2 upper lateral incisor
T3 upper canine
T4 upper first premolar
T5 upper second premolar T6 upper first molar
T7 upper second molar
T8 lower central incisor
T9 lower lateral incisor
T10 lower canine
T11 lower first premolar
T12 lower second premolar
T13 lower first molar
T14 lower second molar

The invention claimed is:

1. A method for designing a dental prosthetic device by use of a computer, comprising:
   acquiring scan data of maxillary and mandibular dentitions;
   determining a restoration site of a tooth, based on the scan data;
   reading out plural pieces of attrition shape data of a first tooth, the first tooth being related to the restoration site, from maxillary and mandibular tooth shape data sets having plural pieces of attrition shape data with different degrees of attrition for each tooth of the maxillary and mandibular dentitions;
   selecting attrition shape data from among the plural pieces of attrition shape data, in accordance with the degrees of attrition of the maxillary and mandibular dentitions;
   placing the selected attrition shape data at the restoration site;
   creating shape data of a dental prosthetic device from the attrition shape data placed at the restoration site; and
   producing the dental prosthetic device based on the created shape data,
   wherein the selecting of the attrition shape data includes:
      creating a virtual curve joining buccal cusp apexes of molars and premolars, an apex of a canine, and incisal edges of incisors when maxillary and mandibular dentitions are viewed from a lateral side;
      placing the plural pieces of attrition shape data at the restoration site such that tooth tips lie on the virtual curve;
      calculating a positional relationship between the first tooth and a second tooth based on the placed plural pieces of attrition shape data, wherein
         the second tooth is adjacent to the first tooth, and the positional relationship is a distance between respective marginal ridges of the first and second teeth, or
         the second tooth opposes the first tooth, and the positional relationship is a relative positioning of the first and second teeth with respect to a vertical direction; and
      selecting the attrition shape data from among the plural pieces of attrition shape data based on the calculated positional relationship.

2. The method for designing of claim 1, wherein
   the plural pieces of attrition shape data include plural pieces of shape data of a tooth whose attrition portion has been drilled stepwise from a crown side toward a root side, for each of a plurality of teeth.

3. The method for designing of claim 1, wherein
   the maxillary and mandibular tooth shape data sets include:
   shape data of maxillary teeth including an upper central incisor, an upper lateral incisor, an upper canine, an upper first premolar, an upper second premolar, an upper first molar, and an upper second molar; and
   shape data of mandibular teeth including a lower central incisor, a lower lateral incisor, a lower canine, a lower first premolar, a lower second premolar, a lower first molar, and a lower second molar.

4. The method for designing of claim 3, wherein
   the plural pieces of the attrition shape data of the maxillary teeth include:
   plural pieces of attrition shape data of the upper central incisor whose lingual surface in contact with an opposing tooth has been drilled stepwise within a range of 0.00 mm or more and 1.50 mm or less from a crown side toward the root side;
   plural pieces of attrition shape data of the upper lateral incisor whose lingual surface in contact with an opposing tooth has been drilled stepwise within the range of 0.00 mm or more and 1.50 mm or less from the crown side toward the root side;
   plural pieces of attrition shape data of the upper canine whose lingual surface in contact with an opposing tooth has been drilled stepwise within the range of 0.00 mm or more and 2.00 mm or less from the crown side toward the root side;
   plural pieces of attrition shape data of the upper first premolar whose occlusal surface in contact with an opposing tooth has been drilled stepwise within the range of 0.00 mm or more and 2.00 mm or less from the crown side toward the root side;
   plural pieces of attrition shape data of the upper second premolar whose occlusal surface in contact with an opposing tooth has been drilled stepwise within the range of 0.00 mm or more and 2.00 mm or less from the crown side toward the root side;
   plural pieces of attrition shape data of the upper first molar whose occlusal surface in contact with an opposing tooth has been drilled stepwise within the range of 0.00 mm or more and 1.50 mm or less from the crown side toward the root side; and
   plural pieces of attrition shape data of the upper second molar whose occlusal surface in contact with an opposing tooth has been drilled stepwise within the range of 0.00 mm or more and 1.50 mm or less from the crown side toward the root side, and wherein the plural pieces of the attrition shape data of the mandibular teeth include:
   plural pieces of attrition shape data of the lower central incisor whose incisal edge in contact with an opposing tooth has been drilled stepwise within the range of 0.00 mm or more and 1.50 mm or less from the crown side toward the root side;
   plural pieces of attrition shape data of the lower lateral incisor whose incisal edge in contact with an opposing tooth has been drilled stepwise within the range of 0.00 mm or more and 1.50 mm or less from the crown side toward the root side;
   plural pieces of attrition shape data of the lower canine whose apex in contact with an opposing tooth has been drilled stepwise within a range of 0.00 mm or more and 2.00 mm or less from the crown side toward the root side;
   plural pieces of attrition shape data of the lower first premolar whose occlusal surface in contact with an opposing tooth has been drilled stepwise within the range of 0.00 mm or more and 2.00 mm or less from the crown side toward the root side;
   plural pieces of attrition shape data of the lower second premolar whose occlusal surface in contact with an opposing tooth has been drilled stepwise within the range of 0.00 mm or more and 2.00 mm or less from the crown side toward the root side;

plural pieces of attrition shape data of the lower first molar whose occlusal surface in contact with an opposing tooth has been drilled stepwise within the range of 0.00 mm or more and 1.50 mm or less from the crown side toward the root side; and plural pieces of attrition shape data of the lower second molar whose occlusal surface in contact with an opposing tooth has been drilled stepwise within the range of 0.00 mm or more and 1.50 mm or less from the crown side toward the root side.

5. The method for designing of claim 1, wherein
the reading out of the plural pieces of attrition shape data includes displaying the plural pieces of attrition shape data on a display device, and wherein
the selecting of the attrition shape data includes selecting the attrition shape data from among the plural pieces of attrition shape data based on input information input to an input device through a user's operation.

6. The method for designing of claim 1,
wherein the second tooth is adjacent to the first tooth,
wherein the calculating of the positional relationship includes calculating the distance between the marginal ridge of the first tooth represented by attrition shape data, whose tip lies on the virtual curve, and the marginal ridge of the second tooth adjacent to the first tooth represented by attrition shape data, and
wherein the selecting of the attrition shape data from among the plural pieces of attrition shape data is performed based on the distance calculated.

7. The method for designing of claim 1,
wherein the second tooth opposes the first tooth,
wherein the calculating of the positional relationship includes calculating an amount of interference or an amount of separation between the first tooth represented by attrition shape data and the second tooth, relative to the vertical direction, at a time when a maxillary dentition and a mandibular dentition occlude, and
wherein the selecting of the attrition shape data from among the plural pieces of attrition shape data is performed based on the amount of interference or the amount of separation calculated.

8. The method for designing of claim 7, wherein
the selecting of the attrition shape data from among the plural pieces of attrition shape data based on the amount of interference or the amount of separation calculated includes selecting attrition shape data with the amount of interference or the amount of separation equal to or less than 0.5 mm.

9. A dental prosthetic device producing system, comprising: a design apparatus for designing a dental prosthetic device; and a machining apparatus for producing the dental prosthetic device, wherein the design apparatus includes: a processor; and a storage device storing instructions executed by the processor, the storage device storing maxillary and mandibular tooth shape data sets having plural pieces of attrition shape data with different degrees of attrition for each tooth of maxillary and mandibular dentitions, the instructions including: acquiring scan data of the maxillary and mandibular dentitions; determining a restoration site of a tooth, based on the scan data; reading out plural pieces of attrition shape data of a first tooth, the first tooth being related to the restoration site, from the maxillary and mandibular tooth shape data sets; selecting attrition shape data from among the plural pieces of attrition shape data, in accordance with the degrees of attrition of the maxillary and mandibular dentitions; placing the selected attrition shape data at the restoration site; creating shape data of the dental prosthetic device from the attrition shape data placed at the restoration site; and sending the created shape data to the machining apparatus, whereby the machining apparatus produces the dental prosthetic device based on the created shape data, wherein the selecting of the attrition shape data includes: creating a virtual curve joining buccal cusp apexes of molars and premolars, an apex of a canine, and incisal edges of incisors when maxillary and mandibular dentitions are viewed from a lateral side; placing the plural pieces of attrition shape data at the restoration site such that tooth tips lie on the virtual curve; calculating a positional relationship between the first tooth and a second tooth based on the placed plural pieces of attrition shape data, wherein the second tooth is adjacent to the first tooth, and the positional relationship is a distance between respective marginal ridges of the first and second teeth, or the second tooth opposes the first tooth, and the positional relationship is a relative positioning of the first and second teeth with respect to a vertical direction; and selecting the attrition shape data from among the plural pieces of attrition shape data based on the calculated positional relationship, wherein the machining apparatus is configured to produce the dental prosthetic device based on the created shape data of the dental prosthetic device from the attrition shape data placed at the restoration site.

10. The dental prosthetic device producing system of claim 9,
wherein the second tooth is adjacent to the first tooth,
wherein the calculating of the positional relationship includes calculating the distance between the marginal ridge of the first tooth represented by attrition shape data, whose tip lies on the virtual curve, and the marginal ridge of the second tooth adjacent to the first tooth represented by attrition shape data, and
wherein the selecting of the attrition shape data from among the plural pieces of attrition shape data is performed based on the distance calculated.

11. The dental prosthetic device producing system of claim 9,
wherein the second tooth opposes the first tooth,
wherein the calculating of the positional relationship includes calculating an amount of interference or an amount of separation between the first tooth represented by attrition shape data and the second tooth, relative to the vertical direction, at the time when a maxillary dentition and a mandibular dentition occlude, and
wherein the selecting of the attrition shape data from among the plural pieces of attrition shape data is performed based on the amount of interference or the amount of separation calculated.

12. The dental prosthetic device producing system of claim 11, wherein
the selecting of the attrition shape data from among the plural pieces of attrition shape data based on the amount of interference or the amount of separation calculated includes selecting attrition shape data with the amount of interference or the amount of separation equal to or less than 0.5 mm.

* * * * *